US012533289B2

(12) United States Patent
Koh et al.

(10) Patent No.: US 12,533,289 B2
(45) Date of Patent: Jan. 27, 2026

(54) CHEST WALL THERAPY GARMENT

(71) Applicant: Hill-Rom Services PTE. LTD., Singapore (SG)

(72) Inventors: Qingqing Koh, Singapore (SG); Kok Boon R. Ong, Singapore (SG); Kean Peng Tay, Singapore (SG); Gee Han Png, Singapore (SG); Aaron A. Ayu, Singapore (SG); Yaolong Lou, Singapore (SG); Wei Bian, Singapore (SG); Moei Ting M. Kuwn, Singapore (SG); Susan E. Malaret, Chanhassen, MN (US)

(73) Assignee: Hill-Rom Services PTE. LTD., Singapore (SG)

( * ) Notice: Subject to any disclaimer, the term of this patent is extended or adjusted under 35 U.S.C. 154(b) by 701 days.

(21) Appl. No.: 17/943,471

(22) Filed: Sep. 13, 2022

(65) Prior Publication Data

US 2023/0099402 A1 Mar. 30, 2023

Related U.S. Application Data

(60) Provisional application No. 63/250,454, filed on Sep. 30, 2021.

(51) Int. Cl.
*A61H 31/00* (2006.01)
*A61H 9/00* (2006.01)

(52) U.S. Cl.
CPC ........... *A61H 31/00* (2013.01); *A61H 9/0007* (2013.01); *A61H 9/0092* (2013.01);
(Continued)

(58) Field of Classification Search
CPC ...... A61H 31/00; A61H 31/02; A61H 9/0007; A61H 9/00; A61H 9/005; A61H 9/0078;
(Continued)

(56) References Cited

U.S. PATENT DOCUMENTS

| | | | |
|---|---|---|---|
| 1,898,652 | A | 2/1933 | Williams |
| 2,223,570 | A | 12/1940 | Mcmillin |

(Continued)

FOREIGN PATENT DOCUMENTS

| | | | |
|---|---|---|---|
| EP | 1220652 | A2 | 7/2022 |
| KR | 10-2014-0103477 | A | 8/2014 |
| KR | 10-1827371 | B1 | 2/2018 |

OTHER PUBLICATIONS

Notification of Transmittal of the International Search Report and the Written Opinion of the International Searching Authority, or the Declaration; International Search Report; and Written Opinion of the International Searching Authority for PCT Patent Application No. PCT/SG2022/050653; mailed Feb. 27, 2023 (14 pages).

(Continued)

*Primary Examiner* — Timothy A Stanis
*Assistant Examiner* — Tyler A Raubenstraw
(74) *Attorney, Agent, or Firm* — Barnes & Thornburg LLP

(57) ABSTRACT

Devices, systems, and methods for High Frequency Chest Wall Oscillation therapy can include a therapy garment including a covering garment for dressing on a patient's torso, the covering garment including a bladder pocket defined between inward and outward layers, and a fluid bladder arranged within the bladder pocket. The fluid bladder can define a pressurizable chamber adapted to receive pressurized fluid to provide force of high frequency pressure oscillation to a patient's chest wall. The pressurizable chamber can be formed to define an outer profile shaped to correspond closely with the patient's rib cage profile to reduce transfer of force of high frequency chest oscillation to the patient's torso outside of the patient's rib cage profile.

20 Claims, 17 Drawing Sheets

(52) U.S. Cl.
CPC ................ *A61H 2201/1409* (2013.01); *A61H 2201/1621* (2013.01); *A61H 2201/165* (2013.01); *A61H 2201/1654* (2013.01)

(58) Field of Classification Search
CPC .......... A61H 9/0092; A61H 2201/1409; A61H 2201/14; A61H 2201/1621; A61H 2201/165; A61H 2201/1654; A41D 1/04
See application file for complete search history.

(56) References Cited

U.S. PATENT DOCUMENTS

| | | | | |
|---|---|---|---|---|
| 2,354,397 | A | 7/1944 | Miller | |
| 2,529,258 | A | 11/1950 | Gonzalez | |
| 2,575,398 | A | 11/1951 | Schroeder | |
| 2,588,192 | A | 3/1952 | Akerman et al. | |
| 2,626,601 | A | 1/1953 | Riley | |
| 2,648,325 | A | 8/1953 | Siple | |
| 2,707,948 | A | 5/1955 | Emerson | |
| 2,762,200 | A | 9/1956 | Huxley | |
| 2,762,366 | A | 9/1956 | Huxley, III et al. | |
| 2,779,329 | A | 1/1957 | Huxley, III et al. | |
| 2,780,222 | A | 2/1957 | Polzin et al. | |
| 2,869,537 | A | 1/1959 | Jen-Chu | |
| 2,899,955 | A | 8/1959 | Huxley, III et al. | |
| 2,918,917 | A | 12/1959 | Emerson | |
| 3,029,743 | A | 4/1962 | Johns | |
| 3,043,292 | A | 7/1962 | Mendelson | |
| 3,063,444 | A | 11/1962 | Jobst | |
| 3,078,842 | A | 2/1963 | Gray | |
| 3,120,228 | A | 2/1964 | Huxley, III | |
| 3,164,100 | A | 1/1965 | Hughes | |
| 3,179,106 | A | 4/1965 | Meredith | |
| 3,288,132 | A | 11/1966 | Meredith | |
| 3,307,533 | A | 3/1967 | Meredith et al. | |
| 3,310,050 | A | 3/1967 | Goldfarb | |
| 3,545,017 | A | 12/1970 | Marvin | |
| 3,566,862 | A | 3/1971 | Schuh et al. | |
| 3,577,977 | A | 5/1971 | Ritzinger, Jr. et al. | |
| 3,683,655 | A | 8/1972 | White et al. | |
| 3,760,801 | A | 9/1973 | Borgeas | |
| 3,885,554 | A | 5/1975 | Rockwell, Jr. | |
| 3,896,794 | A | 7/1975 | Mcgrath | |
| 3,993,053 | A | 11/1976 | Grossan | |
| 4,004,579 | A | 1/1977 | Dedo | |
| 4,120,297 | A | 10/1978 | Rabischong et al. | |
| 4,135,503 | A | 1/1979 | Romano | |
| 4,178,922 | A | 12/1979 | Curlee | |
| 4,186,732 | A | 2/1980 | Christoffel | |
| 4,239,039 | A | 12/1980 | Thompson | |
| 4,375,217 | A | 3/1983 | Arkans | |
| 4,402,312 | A | 9/1983 | Villari et al. | |
| 4,424,806 | A | 1/1984 | Newman et al. | |
| D274,097 | S | 5/1984 | Nakao et al. | |
| 4,481,944 | A | 11/1984 | Bunnell | |
| 4,523,579 | A | 6/1985 | Barry | |
| 4,538,604 | A | 9/1985 | Usry et al. | |
| 4,577,626 | A | 3/1986 | Marukawa et al. | |
| 4,590,925 | A | 5/1986 | Dillon | |
| 4,621,621 | A | 11/1986 | Marsalis | |
| 4,637,074 | A | 1/1987 | Taheri | |
| 4,676,232 | A | 6/1987 | Olsson et al. | |
| 4,682,588 | A | 7/1987 | Curlee | |
| 4,805,612 | A | 2/1989 | Jensen | |
| 4,815,452 | A | 3/1989 | Hayek | |
| 4,838,263 | A | 6/1989 | Warwick et al. | |
| 4,928,674 | A | 5/1990 | Halperin et al. | |
| 4,952,095 | A | 8/1990 | Walters | |
| 4,977,889 | A | 12/1990 | Budd | |
| 4,979,375 | A | 12/1990 | Nathans et al. | |
| 5,007,412 | A | 4/1991 | Dewall | |
| 5,055,052 | A | 10/1991 | Johnsen | |
| 5,056,505 | A | 10/1991 | Warwick et al. | |
| 5,222,478 | A | 6/1993 | Scarberry et al. | |
| 5,235,967 | A | 8/1993 | Arbisi et al. | |
| 5,245,990 | A | 9/1993 | Bertinin | |
| 5,269,659 | A | 12/1993 | Hampton et al. | |
| D353,202 | S | 12/1994 | Hong | |
| 5,370,603 | A | 12/1994 | Newman | |
| 5,453,081 | A | 9/1995 | Hansen | |
| 5,490,820 | A | 2/1996 | Schock et al. | |
| 5,494,469 | A | 2/1996 | Heath et al. | |
| 5,569,170 | A | 10/1996 | Hansen | |
| 5,606,754 | A | 3/1997 | Hand et al. | |
| D379,396 | S | 5/1997 | Rongo et al. | |
| 5,674,269 | A | 10/1997 | Augustine | |
| 5,769,797 | A | 6/1998 | Van Brunt et al. | |
| 5,769,800 | A | 6/1998 | Gelfand et al. | |
| 5,800,489 | A | 9/1998 | Augustine | |
| 5,836,751 | A | 11/1998 | De Villiers | |
| 5,938,627 | A * | 8/1999 | Hickman | A61H 9/0078 601/149 |
| 6,030,353 | A | 2/2000 | Van Brunt | |
| 6,155,996 | A | 12/2000 | Van Brunt et al. | |
| 6,254,556 | B1 | 7/2001 | Hansen et al. | |
| 6,379,316 | B1 | 4/2002 | Van Brunt et al. | |
| D456,591 | S | 5/2002 | Hansen | |
| D461,897 | S | 8/2002 | Hansen et al. | |
| 6,471,663 | B1 | 10/2002 | Van Brunt et al. | |
| D469,876 | S | 2/2003 | Hansen et al. | |
| 6,547,749 | B2 | 4/2003 | Hansen | |
| D478,989 | S | 8/2003 | Hansen et al. | |
| 6,676,614 | B1 * | 1/2004 | Hansen | A61H 23/04 601/44 |
| D497,670 | S | 10/2004 | Hampson | |
| D506,553 | S | 6/2005 | Tesluk | |
| 6,958,046 | B2 | 10/2005 | Warwick et al. | |
| 7,018,348 | B2 * | 3/2006 | Van Brunt | A61B 10/0045 601/44 |
| 7,060,041 | B1 * | 6/2006 | Weil | A61H 31/006 601/106 |
| 7,278,978 | B1 | 10/2007 | Hansen et al. | |
| 7,316,658 | B2 | 1/2008 | Gagne | |
| 7,374,550 | B2 | 5/2008 | Hansen et al. | |
| 7,537,575 | B2 | 5/2009 | Hansen et al. | |
| 7,582,065 | B2 * | 9/2009 | Van Brunt | A61H 9/0078 601/DIG. 7 |
| D639,954 | S | 6/2011 | Helgeson et al. | |
| 8,460,223 | B2 | 6/2013 | Huster et al. | |
| 9,320,674 | B2 * | 4/2016 | Fraser | A61H 9/0078 |
| 9,549,869 | B2 | 1/2017 | Devlieger et al. | |
| 9,603,771 | B1 * | 3/2017 | Alvarez | A61H 9/0078 |
| 9,744,097 | B2 | 8/2017 | Devlieger et al. | |
| 9,901,510 | B2 | 2/2018 | Smith | |
| 9,968,511 | B2 | 5/2018 | Huster et al. | |
| D834,718 | S | 11/2018 | Bobey et al. | |
| 10,292,890 | B2 | 5/2019 | Devliegar et al. | |
| D852,969 | S | 7/2019 | Bobey et al. | |
| D870,904 | S | 12/2019 | Bobey et al. | |
| D879,982 | S | 3/2020 | Bobey et al. | |
| D898,926 | S | 10/2020 | Bobey et al. | |
| D912,259 | S | 3/2021 | Bobey et al. | |
| 10,959,912 | B2 | 3/2021 | Smith | |
| 10,980,695 | B2 | 4/2021 | Devlieger et al. | |
| 11,110,028 | B2 | 9/2021 | Huster et al. | |
| D933,841 | S | 10/2021 | Bobey et al. | |
| D937,429 | S | 11/2021 | Bobey et al. | |
| 2002/0082531 | A1 | 6/2002 | VanBrunt et al. | |
| 2004/0097843 | A1 | 5/2004 | Van Brunt et al. | |
| 2004/0158177 | A1 * | 8/2004 | Van Brunt | A61H 9/0078 601/44 |
| 2005/0054956 | A1 * | 3/2005 | Gagne | A61H 31/006 601/44 |
| 2005/0143796 | A1 | 6/2005 | Augustine et al. | |
| 2005/0234372 | A1 * | 10/2005 | Hansen | A61H 31/006 601/44 |
| 2005/0267387 | A1 * | 12/2005 | Baldauf | A61H 31/02 601/44 |
| 2007/0010765 | A1 * | 1/2007 | Rothman | A61H 9/0078 601/DIG. 7 |
| 2007/0093731 | A1 | 4/2007 | Warwick et al. | |
| 2007/0239087 | A1 * | 10/2007 | Kivisto | A61H 31/006 601/44 |

(56) References Cited

U.S. PATENT DOCUMENTS

2008/0000477 A1* 1/2008 Huster ..................... A61B 7/04 601/149
2008/0294075 A1* 11/2008 Nozzarella ........... A61H 31/006 601/44
2009/0093740 A1 4/2009 Helgeson et al.
2009/0192421 A1* 7/2009 Huster ................... A61B 5/091 601/44
2009/0234256 A1* 9/2009 Helgeson ............... A61H 31/00 601/41
2010/0326442 A1* 12/2010 Hamilton ............ A61M 16/209 601/41
2011/0087143 A1* 4/2011 Bobey .................. A61H 9/0078 601/152
2011/0098741 A1 4/2011 Pfeiffer
2012/0143103 A1* 6/2012 Branch ................ A61H 1/0237 601/18
2013/0085431 A1* 4/2013 Malhi .................. A61H 9/0078 601/150
2013/0289456 A1* 10/2013 Chang Guo ......... A61H 9/0078 601/149
2013/0331747 A1* 12/2013 Helgeson ............. A61H 9/0078 601/48
2014/0288468 A1* 9/2014 Quintana ............... A61H 31/00 601/41
2015/0025425 A1 1/2015 Mitchell
2016/0113839 A1 4/2016 Mitchell et al.
2016/0271010 A1* 9/2016 Brader ................... A61H 23/02
2017/0007494 A1* 1/2017 Rock ...................... G16H 40/63
2017/0027813 A1* 2/2017 Bobey .................. A61H 9/0078
2017/0281460 A1* 10/2017 Zgoda .................. A61H 31/004
2018/0280646 A1* 10/2018 Freeman ............. A61M 16/024
2019/0038502 A1* 2/2019 Shockley, Jr. ......... A61H 23/02
2019/0274919 A1* 9/2019 Lee ........................ A61H 23/04
2020/0100981 A1* 4/2020 Bobey ................ A61H 23/0263
2020/0337938 A1* 10/2020 Kumar ..................... A41C 3/04
2021/0213216 A1* 7/2021 Smith .................... A61H 31/00
2022/0022562 A1* 1/2022 Simmons ................. A41D 1/04
2022/0087895 A1* 3/2022 Dellimore .............. A61H 31/00
2023/0013131 A1* 1/2023 Chan ....................... A61F 5/013
2023/0381442 A1* 11/2023 Khera ............... A61M 16/0683

OTHER PUBLICATIONS

Extended European Search Report for European Patent Application No. 22877019.4, dated Feb. 21, 2025 (37 pages).

* cited by examiner

CHEST WALL THERAPY GARMENT

The present application claims the benefit, under 35 U.S.C. § 119(e), of U.S. Provisional Application No. 63/250,454, filed Sep. 30, 2021, which is hereby incorporated by reference herein in its entirety.

FIELD

The present disclosure relates to devices, systems, and methods for chest wall therapy. More specifically, the present disclosure relates to devices, systems, and methods for high frequency chest wall oscillation (HFCWO) therapy.

High frequency oscillatory impact to a patient's chest wall can encourage freeing of mucus and/or other build-up from the upper respiratory tract. For example, patient suffering from mucus build up, such as cystic fibrosis patients, can be successfully treated with HFCWO therapy. Yet, applying high frequency oscillation force can be challenging.

SUMMARY

The present application discloses one or more of the features recited in the appended claims and/or the following features which, alone or in any combination, may comprise patentable subject matter.

According to an aspect of the present disclosure, a high frequency chest wall oscillation therapy garment may include a covering garment for dressing on a patient's torso, the covering garment including a bladder pocket defined between inward and outward layers, and a fluid bladder arranged within the bladder pocket and defining a pressurizable chamber adapted to receive pressurized fluid to provide force of high frequency pressure oscillation to a patient's chest wall. The pressurizable chamber may be formed to define an outer profile shaped to correspond closely with the patient's rib cage profile to reduce transfer of force of high frequency chest oscillation to the patient's torso outside of the patient's rib cage profile.

In some embodiments, the outer profile may include a lower edge portion which tracks with the lower edge of the patient's rib cage along the patient's front. The lower edge portion may include a sternum section arranged near the patient's sternum and shaped to correspond with the patient's costal cartilage. The sternum section may be formed at least partially by an overlap of wings of the fluid bladder.

In some embodiments, the lower edge portion may include a spinal section which tracks with the lower edge of the patient's rib cage along the patient's back. The spinal section may include a spinal cutaway which curves around to avoid a portion of the patient's spine near the L1 vertebrae.

In some embodiments, the fluid bladder may include at least one fluid restriction adapted to block against fluid flow. The at least one fluid restriction may include connection between walls of the fluid bladder defining the pressurizable chamber to block against fluid flow in the area. The at least one fluid restriction may include at least one seam. The at least one seam may be a terminal seam separating an area of fluid flow from an area of no fluid flow.

In some embodiments, the at least one fluid restriction may be positioned to correspond with a portion of the patient's sternum to discourage force of high frequency chest oscillation on the portion of the patient's sternum. The at least one fluid restriction may include at least two fluid restrictions. The at least two fluid restrictions may be formed on overlapping wings of the fluid bladder to overlap each other about the patient's torso. The at least one fluid restriction may be positioned to correspond with a portion of the patient's spine to discourage force of high frequency chest oscillation on the portion of the patient's spine.

In some embodiments, the at least one fluid restriction may include at least two fluid restrictions arranged along the patient's spine. The fluid bladder may be integrally formed with the inward layer. In some embodiments, the outward layer of the covering garment may define a stiff layer adapted to impede force of high frequency pressure oscillation of the fluid bladder outward of the patient's chest wall. The inward layer may define a flexible layer to encourage force of high frequency pressure oscillation of the fluid bladder towards the patient's chest wall.

According to another aspect of the present disclosure, a high frequency chest wall oscillation therapy garment may include a covering garment for dressing on a patient's torso, the covering garment including an outward layer and an inward layer, the inward layer arranged to engage a patient's torso and the outward layer arranged outward of the inward layer relative to the patient's torso, the outward and inward layers defining a bladder pocket therebetween, and a fluid bladder adapted to receive pressurized fluid to provide force of high frequency pressure oscillation to a patient's chest wall, the fluid bladder arranged within the bladder pocket. The outward layer of the covering garment may define a stiff layer adapted to impede force of high frequency pressure oscillation of the fluid bladder away from the patient's chest wall and the inward layer defines a flexible layer to encourage force of high frequency pressure oscillation of the fluid bladder towards the patient's chest wall.

In some embodiments, the fluid bladder may be integrally formed with the inward layer. An outer profile of the fluid bladder may include a lower edge portion which tracks with the lower edge of the patient's rib cage along the patient's front. The lower edge portion may include a sternum section arranged near the patient's sternum and shaped to correspond with the patient's costal cartilage. The sternum section may be formed at least partially by an overlap of wings of the fluid bladder.

In some embodiments, the lower edge portion may include a spinal section which tracks with the lower edge of the patient's rib cage along the patient's back. The spinal section may include a spinal cutaway which curves around to avoid a portion of the patient's spine near the L1 vertebrae. The fluid bladder may include at least one fluid restriction adapted to block against fluid flow.

In some embodiments, the at least one fluid restriction may include connection between walls of the fluid bladder defining the pressurizable chamber to block against fluid flow in the area. The at least one fluid restriction may include at least one seam. The at least one seam may be a terminal seam separating an area of fluid flow from an area of no fluid flow. The at least one fluid restriction may be positioned to correspond with a portion of the patient's sternum to discourage force of high frequency chest oscillation on the portion of the patient's sternum.

In some embodiments, the at least one fluid restriction may include at least two fluid restrictions. The at least two fluid restrictions may be formed on overlapping wings of the fluid bladder to overlap each other about the patient's torso. The at least one fluid restriction may be positioned to correspond with a portion of the patient's spine to discourage force of high frequency chest oscillation on the portion of the patient's spine. In some embodiments, the at least one fluid restriction may include at least two fluid restrictions arranged along the patient's spine.

According to another aspect of the present disclosure, a high frequency chest wall oscillation system may include a high frequency chest wall therapy garment as mentioned above, and a pressure oscillation pump in communication with the high frequency chest wall oscillation therapy garment to provide high frequency chest wall oscillation pressure.

According to another aspect of the present disclosure, a high frequency chest wall oscillation system may include a high frequency chest wall therapy garment of claim as mentioned above, and a pressure oscillation pump in communication with the high frequency chest wall oscillation therapy garment to provide high frequency chest wall oscillation pressure.

According to another aspect of the present disclosure, a high frequency chest wall oscillation therapy garment, may include a covering garment for dressing on a patient's torso, the covering garment including a bladder pocket defined between inward and outward layers, a fluid bladder arranged within the bladder pocket and defining a pressurizable chamber adapted to receive pressurized fluid to provide force of high frequency pressure oscillation to a patient's chest wall. The pressurizable chamber may be formed to define an outer profile shaped to correspond closely with the patient's rib cage profile to reduce transfer of force of high frequency chest oscillation to the patient's torso outside of the patient's rib cage profile.

In some embodiments, the outer profile may include a lower edge portion which tracks with the lower edge of the patient's rib cage along the patient's front. The lower edge portion may be arranged to correspond with a lower extent of the patient's lung area and tracks with the lower edge of the patient's rib cage by extending no further than the lower extent. The lower edge portion may extend generally linearly in correspondence with the lower extent of the patient's lung area.

In some embodiments, the outer profile may be shaped to correspond closely with the patient's rib cage profile to reduce transfer of force of high frequency chest oscillation to the patient's torso outside of the patient's rib cage profile with reduced volume while maintaining effective induce airflow for HFCWO therapy. Reduced volume may include no less than 25% reduced volume, and maintaining effective induced airflow for HFCWO therapy includes no greater than 5% reduction of induced airflow.

In some embodiments, the fluid bladder may include at least one fluid restriction adapted to block against fluid flow. The at least one fluid restriction may include connection between walls of the fluid bladder defining the pressurizable chamber to block against fluid flow in the area. The at least one fluid restriction may include at least one seam.

In some embodiments, the at least one seam may be a terminal seam separating an area of fluid flow from an area of no fluid flow. The at least one fluid restriction may be positioned to correspond with a portion of the patient's spine to discourage force of high frequency chest oscillation on the portion of the patient's spine.

In some embodiments, the fluid bladder may be integrally formed with the inward layer. The outward layer of the covering garment may define a stiff layer adapted to impede force of high frequency pressure oscillation of the fluid bladder outward of the patient's chest wall. The inward layer may define a flexible layer to encourage force of high frequency pressure oscillation of the fluid bladder towards the patient's chest wall.

In some embodiments, the outer profile includes a bulbous portion formed to extend coverage across the patient's chest. The bulbous portion may be arranged near an arm opening to extend coverage of the fluid bladder across the patient's pectoral area.

In some embodiments, the outer profile may include a recess formed to correspond with a portion of the patient's spine to avoid engagement therewith. The recess may be arranged near the patient's lower neck and/or upper thoracic spine.

According to another aspect of the present disclosure, a high frequency chest wall oscillation system may include the high frequency chest wall therapy garment and a pressure oscillation pump in communication with the high frequency chest wall therapy garment to provide high frequency chest wall oscillation pressure.

According to still a further aspect of the present disclosure, a high frequency chest wall oscillation (HFCWO) therapy garment may include a garment for dressing on a patient's torso. The garment may include an inner layer and an outer layer between which a bladder pocket may be defined. The outer layer may have a pair of openings therethrough. A fluid bladder may be insertable into and removable from the bladder pocket and may define a pressurizable chamber that may be adapted to receive pressurized fluid to provide force of high frequency pressure oscillation to a patient's chest wall. A pair of pneumatic connectors may be secured to the fluid bladder and may be in pneumatic communication with the pressurizable chamber. The pair of pneumatic connectors may be arranged on the fluid bladder at locations that may permit each pneumatic connector of the pair of pneumatic connectors to extend through a respective one of the openings of the pair of openings in the outer layer of the garment to assist in properly aligning the fluid bladder within the bladder pocket after the fluid bladder is inserted therein.

In some embodiments, the outer layer of the garment may have a first set of fasteners within the bladder pocket and the fluid bladder may have a second set of fasteners. The second set of fasteners may couple to the first set of fasteners to further assist in properly aligning the fluid bladder within the bladder pocket after the fluid bladder is inserted therein. Optionally, the first set of fasteners may include snap receivers and the second set of fasteners may include snaps that may be receivable in the snap receivers. Further optionally, a set of snap buttons may be situated on an exterior of the outer layer and may be coupled to the snap receivers. The snap buttons may be pressable by a user to force the snap receivers onto the snaps. If desired, therefore, one of the first set of fasteners and the second set of fasteners may include male fasteners and the other of the first set of fasteners and the second set of fasteners may include female fasteners.

The present disclosure further contemplates that the pair of pneumatic connectors may include elbow connectors. For example, the elbow connectors each may be bent at a 60 degree angle between opposite ends thereof. Alternatively or additionally, the fluid bladder may include at least one fluid restriction that may be adapted to block against fluid flow within the pressurizable chamber. For example, the at least one fluid restriction may include a connection between an inner wall and an outer wall of the fluid bladder. Optionally, the connection may comprise a weld seam. Further optionally, the weld seam may include a seam that may be formed by sonic welding or radio frequency (RF) welding.

In some embodiments, the pneumatic connectors may be attached to the outer wall of the fluid bladder and the inner wall of the fluid bladder may include at least one air bleed hole. If desired, the at least one air bleed hole may include first and second air bleed holes separated by the at least one fluid restriction. For example, the at least one air bleed hole may include first and second pairs of air bleed holes separated by the at least one fluid restriction.

The present disclosure also contemplates that the garment may include a first fastener section and a second fastener section that may releasably couple with the first fastener section to secure the HFCWO therapy garment about the patient's torso and the pneumatic connectors may be situated between the first and second fastener sections. Optionally, the first and second fastener sections each may include hook and loop fasteners that may engage each other to secure the HFCWO therapy garment about the patient's torso. Further optionally, the garment also may include a flap that may be attached to the second fastener section. If desired, the flap may include hook and loop fastener that also may engage hook and loop fasteners of the first fastener section such that the first fastener section may be sandwiched between the flap and the second fastener section to further secure the HFCWO therapy garment about the patient's torso when the flap is in a closed position. The present disclosure contemplates that the flap may overlie one of the pneumatic connectors of the pair of pneumatic connectors when the flap is in a fully opened position.

Still further, the present disclosure contemplates a high frequency chest wall oscillation system that may include the HFCWO therapy garment described above and an air pulse generator in pneumatic communication with the fluid bladder of the HFCWO therapy garment via a pair of hoses that pneumatically connect to the pair of pneumatic connectors. For example, the air pulse generator may include a blower in combination with motor driven pistons or diaphragms that reciprocate toward and away from each other to create pressure pulses relative to a baseline pressure.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
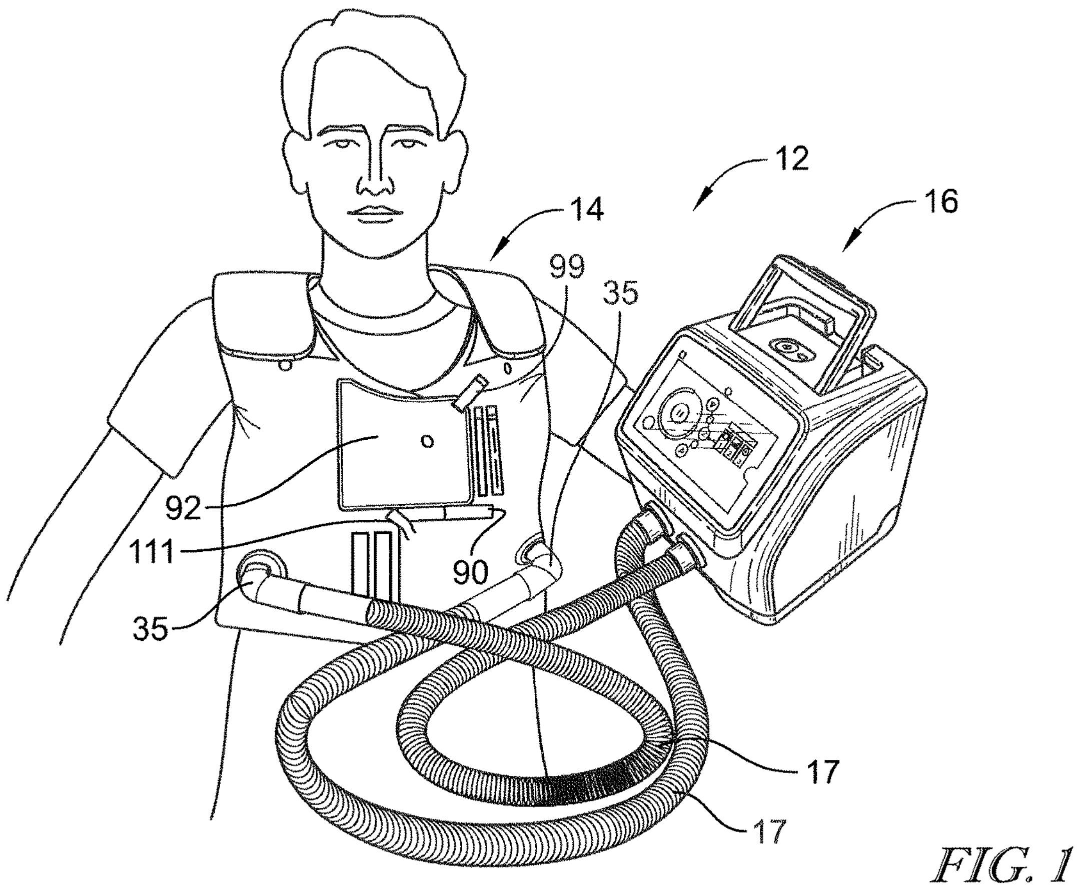
FIG. 1 is a perspective view of a high frequency chest wall oscillation (HFCWO) system including a therapy garment (vest) and HFCWO pump.

For the purposes of promoting an understanding of the principles of the disclosure, reference will now be made to a number of illustrative embodiments illustrated in the drawings and specific language will be used to describe the same.

Build-up within the upper respiratory system, for example, mucus build-up in cystic fibrosis patients, can be effectively treated by encouraging expectoration. High Frequency Chest Wall Oscillation (HFCWO) can assist in loosening build-up by applying repetitive force of impact to the patient's chest wall area.

Referring now to FIG. 1, a HFCWO system 12 is shown including a chest engagement device 14 embodied as a wearable therapy garment vest, a therapeutic force generator 16, also known as an air pulse generator 16, in communication with the vest 14 via one or more fluid hoses 17 to provide pressurized fluid oscillation communicated by the vest 14 to the patient's torso region to provide impact force to the patient's chest wall. Air pulse generator 16 may include, for example, a blower or pump in combination with motor driven pistons or diaphragms that reciprocate toward and away from each other to create pressure pulses relative to a baseline pressure. Non-limiting examples of a suitable force generator and/or force generation mechanism, for example, as force generator 16 and the GUI screens for control and/or operations such generators and/or mechanisms, is provided in U.S. patent application Ser. No. 17/093,764, entitled Adaptive High Frequency Chest Wall Oscillation System, filed on Nov. 10, 2020, the contents of which are incorporated by reference in their entirety, including but not limited to those portions concerning high frequency chest wall oscillation systems, devices, and methods. The vest 14 illustratively includes one or more pressurizable chambers that are arranged in communication with the pump 16 to receive successive pressurization and depressurization to inflate and partly deflate imposing an oscillating impact force on the patient. The application of successive impact force to impose high frequency oscillation of the chest wall as a therapy regime can assist in dislodging mucus from the upper respiratory tract.

Figure 2:
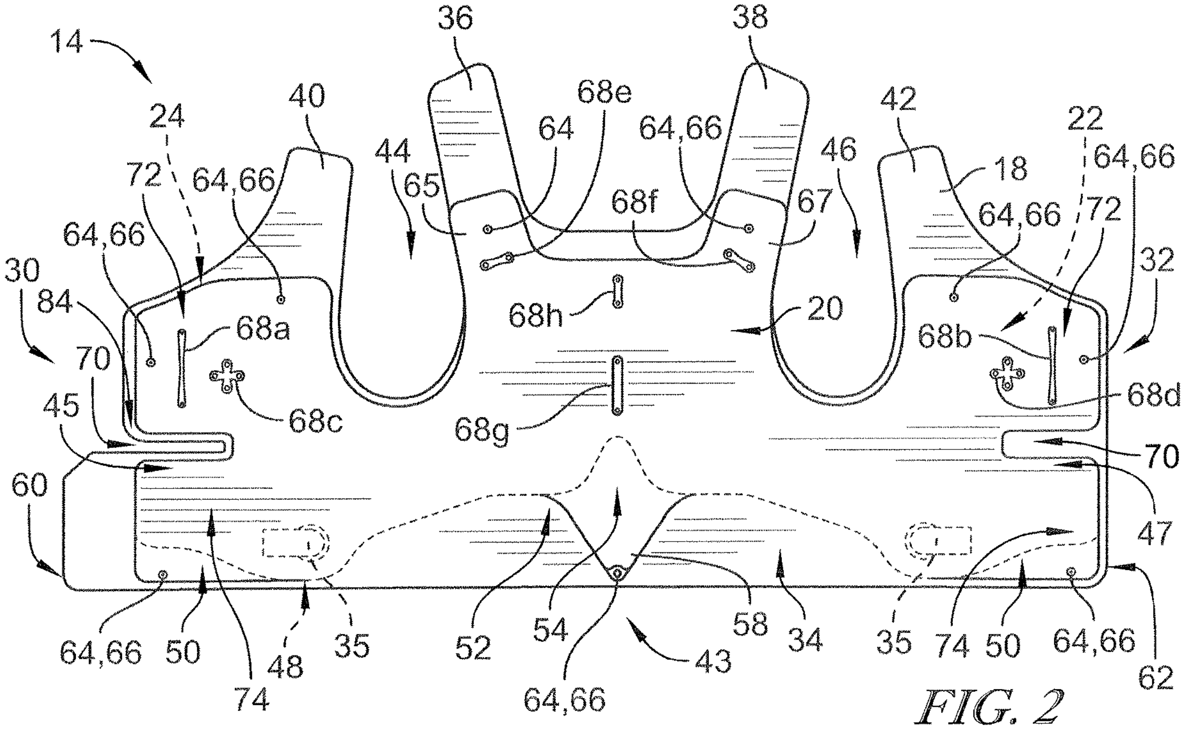
FIG. 2 is a rear elevation view of the therapy garment of the HFCWO system of FIG. 1 including a covering shown in partial transparency to illustrate a fluid bladder within.

Referring to FIG. 2, the therapy garment 14 is shown laid open for descriptive ease. The therapy garment 14 illustratively includes a covering 18 defining the fabric of the garment, and a fluid bladder 20. The fluid bladder 20 defines a pressurizable chamber 22 therein for receiving pressurized fluid. In FIG. 2, the fluid bladder 20 is illustrated as if covering 18 were transparent for ease of description and to show that the fluid bladder 20 is arranged within a bladder pocket 24 defined by the covering 18.

The therapy garment 14 is formed to fold or wrap around the patient's torso to engage the patient's chest and back near the rib cage. The therapy garment 14 includes wings 30, 32 defined at opposite lateral ends of a central region 34. Hose connections 35 are illustratively arranged penetrating through the wings 30, 32 for connection with fluid hoses 17 to communicate fluid with the fluid bladder 20, although in some embodiments, a single hose 17 and hose connection 35 may be applied. The wings 30, 32 can fold or wrap around the patient to encircle the torso.

The central region 34 of the therapy garment 14 engages the patient's back. Shoulder straps 36, 38 extend from the central region 34 over the patient's shoulders and engage with lower strap portions 40, 42 for shoulder support. An arm opening 44, 46 is defined between each wing 30, 32 and the central region 34 to receive the patient's arm therethrough. The arm openings 44, 46 are defined partly by the shoulder strap 36, 38 and corresponding lower strap portion 40, 42, and are enclosed around the patient's arms when the shoulder straps 36, 38 are engaged with the lower strap portions 40, 42.

Figure 3:
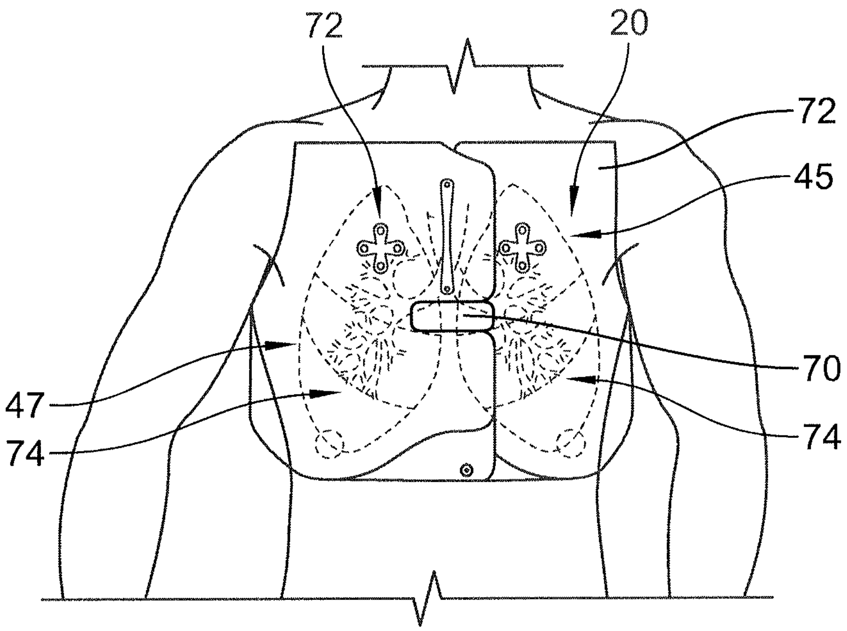
FIG. 3 is a front elevation view of the fluid bladder of the HFCWO system of FIGS. 1 and 2, in isolation, fit to the patient in the same manner as if assembled in the complete therapy garment to illustrate the fluid bladder's fit to the patient torso.
Figure 4:
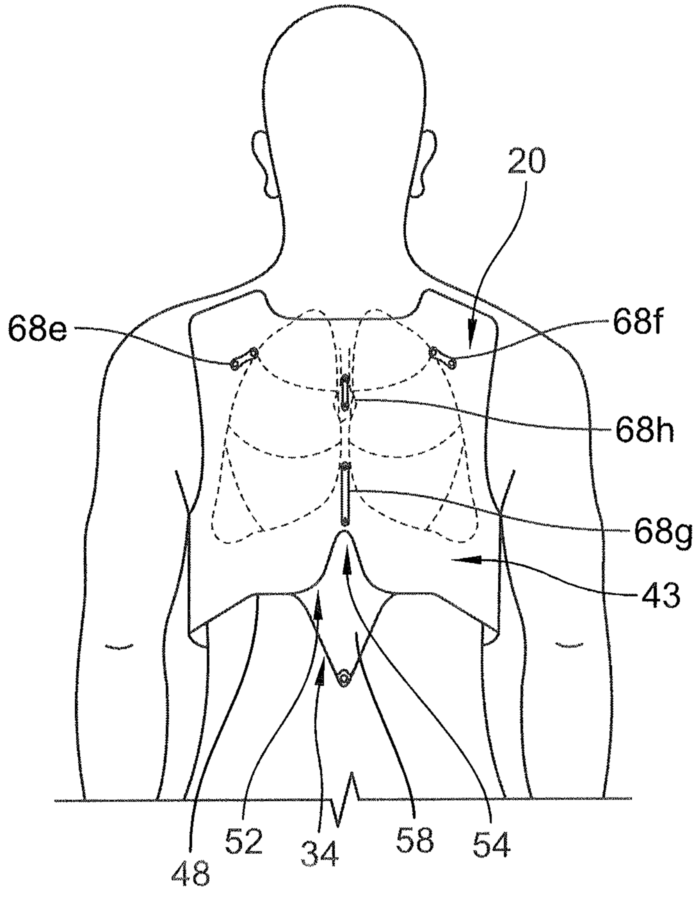
FIG. 4 is a rear elevation view of the fluid bladder of the HFCWO system of FIGS. 1-3, in isolation, fit to the patient in the same manner as if assembled in the complete therapy garment to illustrate the fluid bladder's fit to the patient torso.

Referring now to FIGS. 3 and 4, the fluid bladder 20 is shown in isolation positioned on the patient as it would be arranged when assembled with the entire therapy garment 14 and worn by the patient. The fluid bladder 20 is ergonomically formed to focus pressure oscillation force onto the patient's chest wall to improve the patient's clearing of the upper respiratory tract. In the illustrative embodiment, the fluid bladder 20 defines an outer profile shaped to correspond closely with patient's rib cage. The patient's lung are shown for reference regarding the position of the body, including the rib cage and scapula. The outer profile of the fluid bladder 20 includes a lower edge portion 48 extending with ergonomic curvature between lateral ends of the bladder 20 and the ends 31, 33 of the therapy garment 14 (as shown in FIG. 2).

As shown in FIG. 3, the fluid bladder 20 includes the central portion 43 and wings 45, 47 corresponding to the wings 30, 32 of the therapy garment 14. Along the wings 45, 47 of the fluid bladder 20, the lower edge portion 48 is shaped with curvature to track closely with the patient's rib cage along the patient's front.

The lower edge portion 48 includes a sternum portion 50 arranged corresponding to the patient's sternum. The sternum portion 50 is shaped with curvature to correspond with the patient costal cartilage at the sternum. Accordingly, the lower edge portion 48 can track closely with the patient's front rib cage reducing force outside of the patient's front rib cage to focus oscillation impulse force to the upper respiratory tract. Referring briefly to FIG. 2, as the wings 45, 47 overlap when secured about the patient's torso, the lower edge portion 48 at each wing 30, 32 is shaped to define the sternum portion 50.

Referring to FIG. 4, within the central portion 43 of the fluid bladder 20 corresponding with the patient's back, the lower edge portion 48 of the fluid bladder 20 includes a spinal section 52 arranged to correspond with the patient's spine. The spinal section 52 is shaped with curvature to track closely with the lower edge of the patient's rib cage. The spinal section 52 of the lower edge portion 48 defines a spinal cutaway 54.

The spinal cutaway 54 is illustratively formed as an area of curvature of the lower edge portion 48 avoiding the patient's spine below the thorax spine, namely the avoiding the lumbar spine, for example, L1 vertebrae. Accordingly, the lower edge portion 48 can track closely with the lower edge of the patient's rear rib cage reducing force outside of the patient's rear rib cage to focus oscillation impulse force to the upper respiratory tract.

As shown in FIGS. 2-4, the fluid bladder 20 illustratively includes a tail 58 in the central region 34 and flaps 60,62 on either lateral end. The tail 58 and flaps 60, 62 are each formed as portions of the fluid bladder 20 which do not define an area of the pressurizable chamber 22. The tail 58 and flaps 60, 62 are arranged for securing the fluid bladder 20 within the bladder pocket 24 of the covering 18.

Referring to FIG. 2, the fluid bladder 20 includes a number of snaps 64 having complementary receivers 66 on the interior of the bladder pocket 24 of the covering 18. The snaps 64 are received by the receivers 66 for pressure fit engagement to form a releasable connection between the fluid bladder 20 and the covering 18. The corresponding snaps and receivers 64, 66 selectively connect together to maintain the position of the fluid bladder 20 within the bladder pocket 24.

The tail 58 and flaps 60, 62 each include snaps 64 for connection with complementary receivers 66 of the covering 18. The tail 58 and flaps 60, 62 assist in maintaining position of the fluid bladder 20 in position within the covering 18, and particularly can assist in preventing the lower edge portion 48 from riding up within the bladder pocket 24.

Referring to FIG. 2, the fluid bladder 20 includes a number of fluid restrictions 68 for blocking against fluid flow. The fluid restrictions 68 are illustratively embodied as seams of the fluid bladder 20 in which layers of the bladder 20 forming the fluid chamber 22 are connected (welded) together to prevent fluid from entering the space of the chamber 22 at that location. Fluid restrictions 68 can be arranged at locations where it is desirable to avoid localized percussion during HFCWO therapy, for example, at locations on the body which can cause discomfort. Fluid restrictions 68 can assist in focusing percussion onto areas around their location during HFCWO therapy.

For example, fluid restrictions 68*a* and 68*b* are arranged on the wings 45, 47, respectively, to correspond with the patient's sternum. The fluid restrictions 68*a*, 68*b* are illustratively formed as elongated weld seams. The elongated weld seams of the fluid restrictions 68*a*, 68*b* are each illustratively embodied to a have hourglass shape along the vertical height (along the vertical direction in the orientation of FIG. 2), defining a thinner middle section than upper and lower ends.

As the wings 45, 47 overlap with each other to surround the patient's torso, the fluid restrictions 68*a*, 68*b* overlap each other at the patient's sternum to block against fluid flow in the space defined by the seams, decreasing percussive force on the sternum during HFCWO therapy. In some embodiments, the fluid restrictions 68*a*, 68*b* may have any suitable shape, orientation, and/or manner of construction to block against fluid flow into an area of the fluid bladder 20.

Fluid restrictions 68*c* and 68*d* are arranged on the wings 45, 47. As seen in FIG. 3, fluid restrictions 68*c*, 68*d* are arranged to correspond, respectively, with the left and right pectoral muscle, and generally the central area of each pectoral, as the wings 45, 47 overlap with each other to surround the patient's torso.

The fluid restrictions 68*c*, 68*d* are illustratively formed as two orthogonal intersecting weld seams. More specifically, in the illustrative embodiment, fluid restrictions 68*c*, 68*d* each include a one horizontally oriented weld seam and one vertically oriented weld seam, with intersection at their mid-points. In some embodiments, the fluid restrictions 68*c*, 68*d* may have any suitable shape, orientation, and/or manner of construction to block against fluid flow into an area of the fluid bladder 20.

Fluid restrictions 68*g* and 68*h* are arranged on the central portion 43. In the illustrative embodiment, fluid restrictions 68*g*, 68*h* are arranged to correspond with the patient's spine. Fluid restriction 68*g* is arranged to correspond with the patient's spine near the central thoracic spine.

Fluid restriction 68*g* is illustratively formed to a have constant width (along the horizontal direction in the orientation of FIG. 2). Fluid restriction 68*g* is illustratively faulted as two parallel vertical elongated weld seams connected together at their upper and lower ends (in the orientation in FIG. 2) to block against fluid flow in the area of the seam. In some embodiments, the fluid restriction 68*g* may have any suitable shape, orientation, and/or manner of construction to block against fluid flow into an area of the fluid bladder 20

Fluid restriction 68*h* is arranged to correspond with the patient's spine near the intersection of the patient's thoracic and cervical spine. Fluid restriction 68*h* is illustratively formed as a single vertical elongated weld seam (in the orientation of FIG. 2) to block against fluid flow in the area of the seam. In some embodiments, the fluid restriction 68*h* may have any suitable shape, orientation, and/or manner of construction to block against fluid flow into an area of the fluid bladder 20.

Fluid restrictions 68*e* and 68*f* are arranged on the central portion 43, on shoulder portions 65, 67 of the fluid bladder 20 to correspond to with the patient's scapula. Fluid restrictions 68*e*, 68*f* are illustratively formed as single elongated weld seams slanted horizontally (in the orientation of FIG. 2) to block against fluid flow in the area of the seam.

Referring still to FIG. 2, the wings 45, 47 of the fluid bladder 20 each include a cutout 70 defined therein. The cutout 70 is arranged to divide an upper portion 72 of each wing 45, 47 from a lower portion 74 to encourage complementary fit of the therapy garment 14 with the patient's torso. Each cutout 70 is illustratively arranged to correspond with the patient's chest just below the pectoral muscles, as the wings 30, 32 overlap with each other to surround the patient's torso. A corresponding cutout 84 is arranged on the wing 78 of the covering 18 as discussed in additional detail herein.

The upper portion 72 of each wing 45, 47 is arranged to correspond with the patient's pectoral muscle, generally near ribs 1-4, as the wings 45, 47 overlap with each other to surround the patient's torso. The lower portion 74 of each wing 45, 47 is arranged to correspond with the patient's ribs 5-8 (and 9-10 in some instances), as the wings 45, 47 overlap with each other to surround the patient's torso.

The fluid bladder 20 is illustratively formed of a flexible material for defining the pressurizable chamber 22. The fluid bladder 20 is illustratively formed to resist stretching, but may have some limited resiliency to promote comfort. As previously mentioned, the fluid bladder 20 is illustratively formed of two sheets of material, joined at the outer edges to define the pressurizable chamber 22 therebetween. In some embodiments, the pressurizable chamber 22 may include two or more distinct chambers.

One sheet of material of the fluid bladder 20 is arranged proximal to the patient's body, and the other sheet is arranged distal to the patient's body within the bladder pocket 24. In some embodiments, the fluid bladder 20 may include any suitable number of sheets of material. In the illustrative embodiment, the sheets of the fluid bladder 20 are formed of the same material, but in some embodiments, the sheets may be formed of different material from each other.

Figure 5:
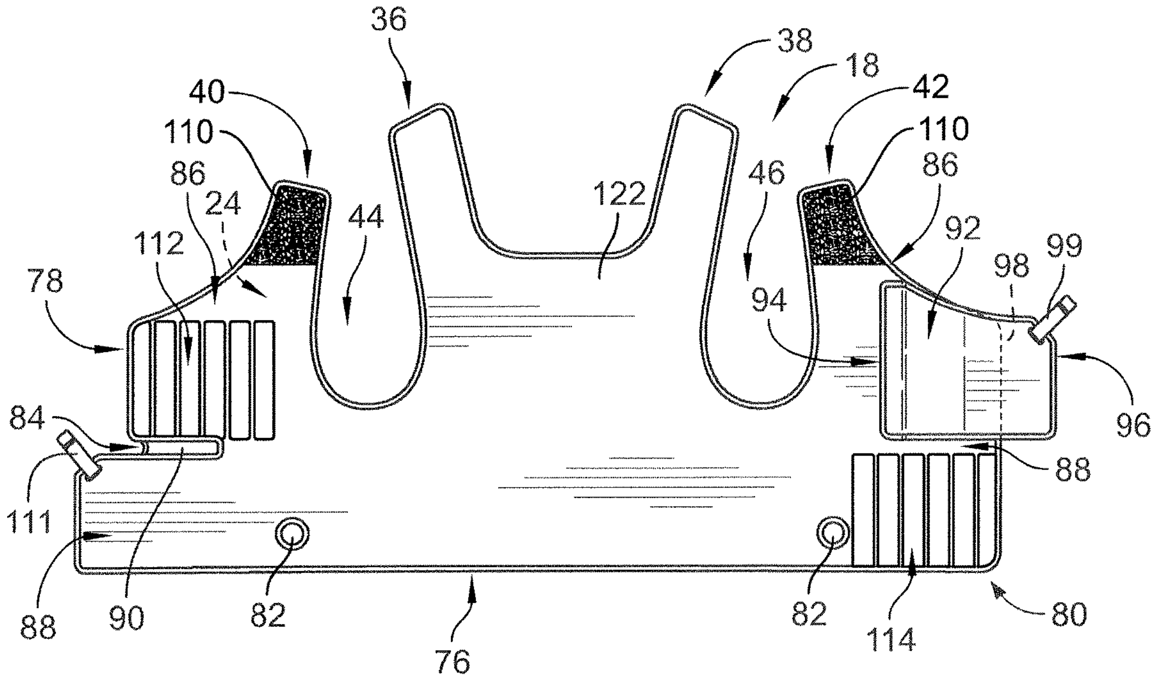
FIG. 5 is a rear elevation view of the covering of the therapy garment of FIGS. 1 and 2 showing connection systems for securing the garment around the patient's torso, and showing that the outer layer of the covering is stiff to block HFCWO force from the fluid bladder away from the patient's chest wall.

Referring now to FIG. 5, the covering 18 is shown laid open for descriptive ease showing an exterior side. The covering 18 includes a central portion 76 which defines a portion of the central region 34 of the therapy garment 14, and wings 78, 80 secured with either side of the central portion 76. The central portion 76 and wings 78, 80 are each formed to correspond in position with the central portion 43 and wings 45, 47 of the fluid bladder 20 to form the central region 34 and wings 30, 32, respectively, of the therapy garment 14 for wrapping around the patient's torso for conforming fit. The wings 78, 80 each include a connection opening 82 for receiving hose connections 35 therethrough.

Referring still to FIG. 5, the wing 78 defines a cutout 84 therein. The cutout 84 is arranged to divide an upper portion 86 of the wing 78 from a lower portion 86 to encourage complementary fit of the therapy garment 14 with the patient's torso. The cutout 84 is illustratively arranged to correspond with the patient's chest below the pectoral muscles.

The cutout 84 is illustratively formed as a gap between the upper and lower portions 86, 88. The cutout 84 includes a connector 90 spanning between the upper and lower portions 86, 88. The connector 90 is illustratively embodied as a resilient, stretchable material, such as spandex, providing a snug but conforming fit about the patient's torso.

The wing 80 omits a cutout, but likewise includes upper and lower portions 86, 88. The upper and lower portions 86, 88 of the wings 78, 80 of the covering 18 corresponding with the upper and lower portions 72, 74 of the wings 45, 47 of the fluid bladder 20, as shown in FIG. 2. The upper portion 86 includes a flap 92 which extends for engagement with the other wing 78 when secured about the patient's torso. The flap 92 is secured with the upper portion 86 at one end 94 and extends to another end 96 that is a free end.

The flap 92 illustratively includes a strap 99 extending from the free end to allow the user to pull the flap 92 forcefully about the patient's torso. The flap 92 extends to the end 96 of the free end beyond an outer edge 98 of the upper portion for engagement with the other wing 78.

The upper portion 86 of each wing 78, 80 forms the lower strap portion 40, 42 for connection with a corresponding shoulder strap portions 36. 38 of the central portion 76. The lower strap portions 40, 42 of the wings 78, 80 include a portion of a fastening system 110 for securing with the corresponding shoulder strap portion 36, 38. The fastening system 110 is illustratively embodied as a hook and loop fastener with the corresponding shoulder strap portion 36, 38 having a complementary portion of the hook and loop fastener 110 on an interior side as seen in FIG. 6.

The upper portion 86 of the wing 78 includes a fastening system 112 for securing with the flap 92 of the wing 80. The fastening system 112 is illustratively embodied as a hook and loop fastener, with the flap 92 of the wing 80 having a complementary portion of the hook and loop fastener 112 on an interior side as seen in FIG. 6.

The lower portion 88 of the wing 80 includes a fastening system 114 for securing with the lower portion 88 of the wing 78. The fastening system 114 is illustratively embodied as a hook and loop fastener, with the lower portion 88 of the wing 78 having a complementary portion of the hook and loop fastener 114 on an interior side as seen in FIG. 6. The lower portion 88 of the wing 78 extends beyond an outer edge of the upper portion 86 of the same wing 78, similar to the extension of the flap 92. The lower portion 88 includes a strap 120 extending from a free end to allow the user to pull the lower portion 88 tightly about the patient's torso.

Figure 6:
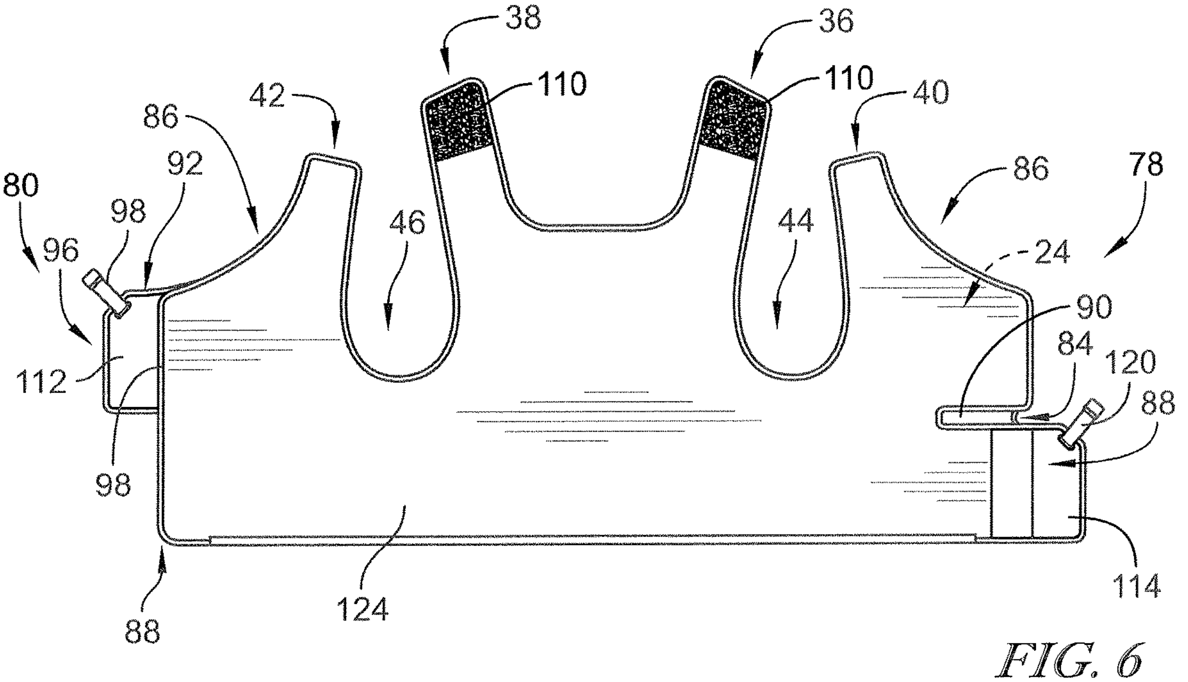
FIG. 6 is a front elevation view of the covering of FIG. 5 showing that the inner layer is flexible to encourage HFCWO force from the fluid bladder towards the patient's chest wall.

As can be observed from FIGS. 5 and 6, the wing 78 can be wrapped over the wing 80 such that the portion of fastening system 114 of the lower portion 88 of the wing 78 engages with the portion of the fastening system 114 of the lower portion 88 of the wing 80. The flap 92 (and wing 80) is wrapped over the wing 78 to engage its portion of the fastening system 112 with the portion of the fastening system 112 on the upper portion 86 of the wing 78. The flap 92 extends over the wing 78 and allows the wing 80 to be covered by the wing 78. Accordingly a conforming fit can be made with the patient's torso.

Referring to FIG. 5, the covering 18 includes an outer layer 122. The outer layer 122 is formed to wrap around the patient's torso, but to remain otherwise relatively stiff to encourage control of pressure oscillation to remain inwardly directed towards the patient's chest wall. The stiffness of the outer layer 122 can block against the force of pressure oscillation force directed outward of the patient's torso, and thus away from the patient's chest wall. In one non-limiting example, the outer layer 122 may be formed of a stretch resistant fabric such as canvas and/or may be reinforced to reduce flexibility apart from wrapping around the patient's torso.

Referring to FIG. 6, the covering includes an inner layer 124. The inner layer 124 is illustratively formed to flexibly wrap around the patient's torso, to encourage transfer of pressure oscillation force from the fluid bladder 20 (within the bladder pocket 24 of the covering 18) to the patient's chest wall. The inner layer 124 may be formed of a stretchable material providing low resistance to pressure oscillation force to the patient's chest wall. In one non-limiting example, the inner layer 124 may be formed of spandex and polyester blend.

The flexibility of the inner layer 124 can promote complementary fit of the therapy garment 14 about the patient's torso to increase efficiency of pressure oscillation to the chest wall, and/or to reduce discomfort to the patient. In some embodiments, the inner layer 124 may form some or all of a wall of the fluid bladder 20.

Figure 7:
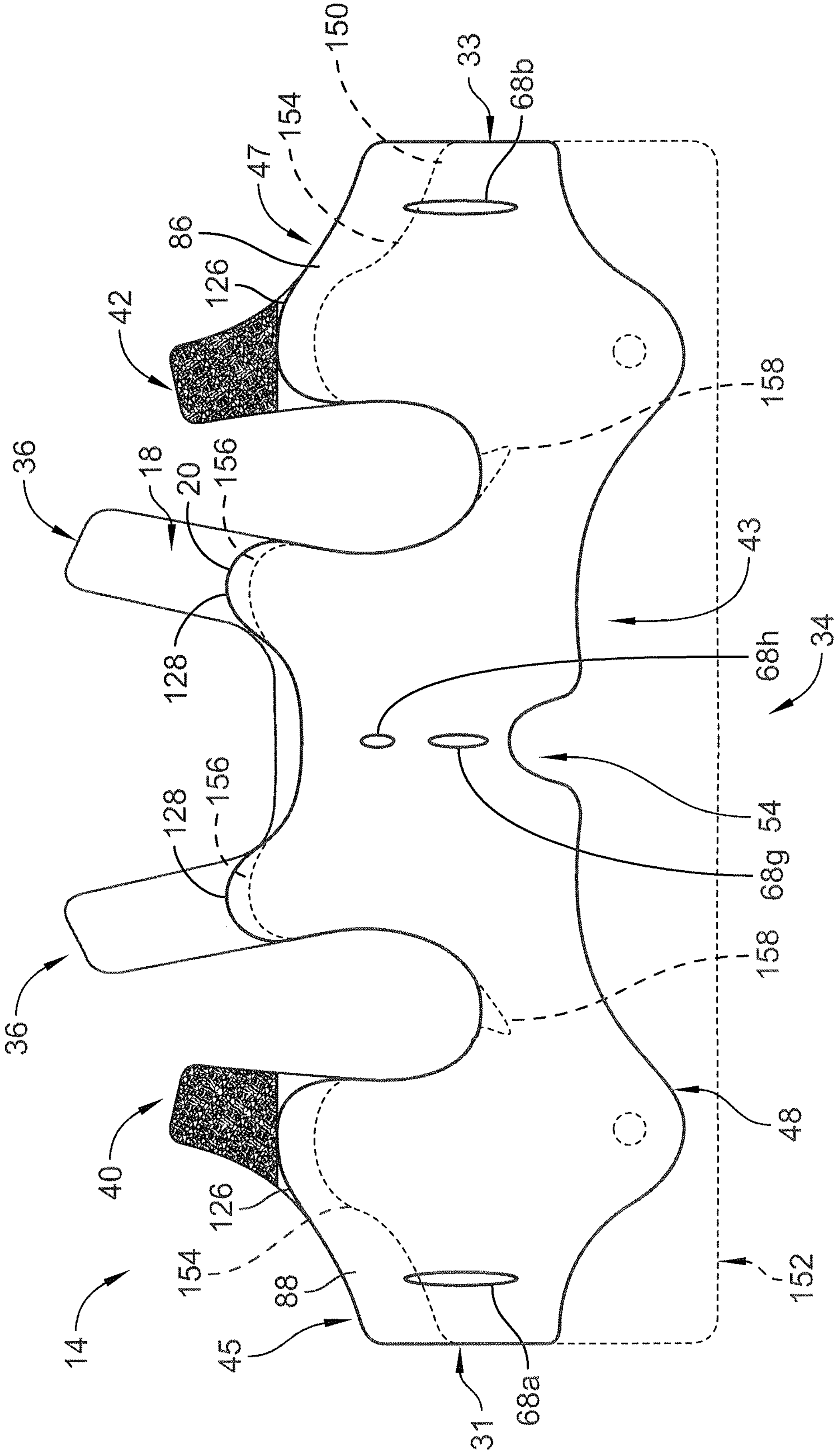
FIG. 7 is a rear elevation view of the therapy garment of FIG. 2 having the fluid bladder overlain with a conventional fluid bladder for comparison.

Referring now to FIG. 7, the fluid bladder 20 is shown overlaid with a conventional fluid bladder 150 to emphasize the differences in form. The shape of the conventional fluid bladder 150 is shown in broken line for comparison to the shape of the fluid bladder 20 shown in solid bold line. The tailoring of the lower edge portion 48 of the fluid bladder 20 is more apparent compared with the conventional fluid bladder 150 having a lower edge portion 152 which extends to the lower edge of the covering 18 and includes no contouring.

The fluid bladder 20 includes upper portions 86 of wings 45, 47 which extend considerably higher to an upper edge 126 compared with the upper edge 154 of the conventional fluid bladder 150. The fluid bladder 20 includes an upper edge 128 of the central portion 43 which extends considerably higher than the upper edge 156 of the conventional fluid bladder 150. The fluid bladder 20 can omit armpit notches 158 of the conventional fluid bladder 150.

Increased height of the upper edges 126, 128 can increase the contact area with the patient's chest near the chest wall and related portions of the upper respiratory tract, assisting with focused percussion therapy. The shape of the fluid bladder 20 can increase comfort and/or effectiveness of HFCWO therapy by focusing percussive force onto the preferred areas of the body, reducing errant percussive forces to regions of the patient's body which are less productive for freeing expectorant and/or less comfortable for receiving percussive force. For example, the fluid bladder 20 focuses on the patient's rib cage and avoids the user's stomach and sides. In the illustrative embodiment, the fluid bladder 20 includes a reduced volume from the conventional fluid bladder 150, namely about 40% reduction in volume.

Figure 8:
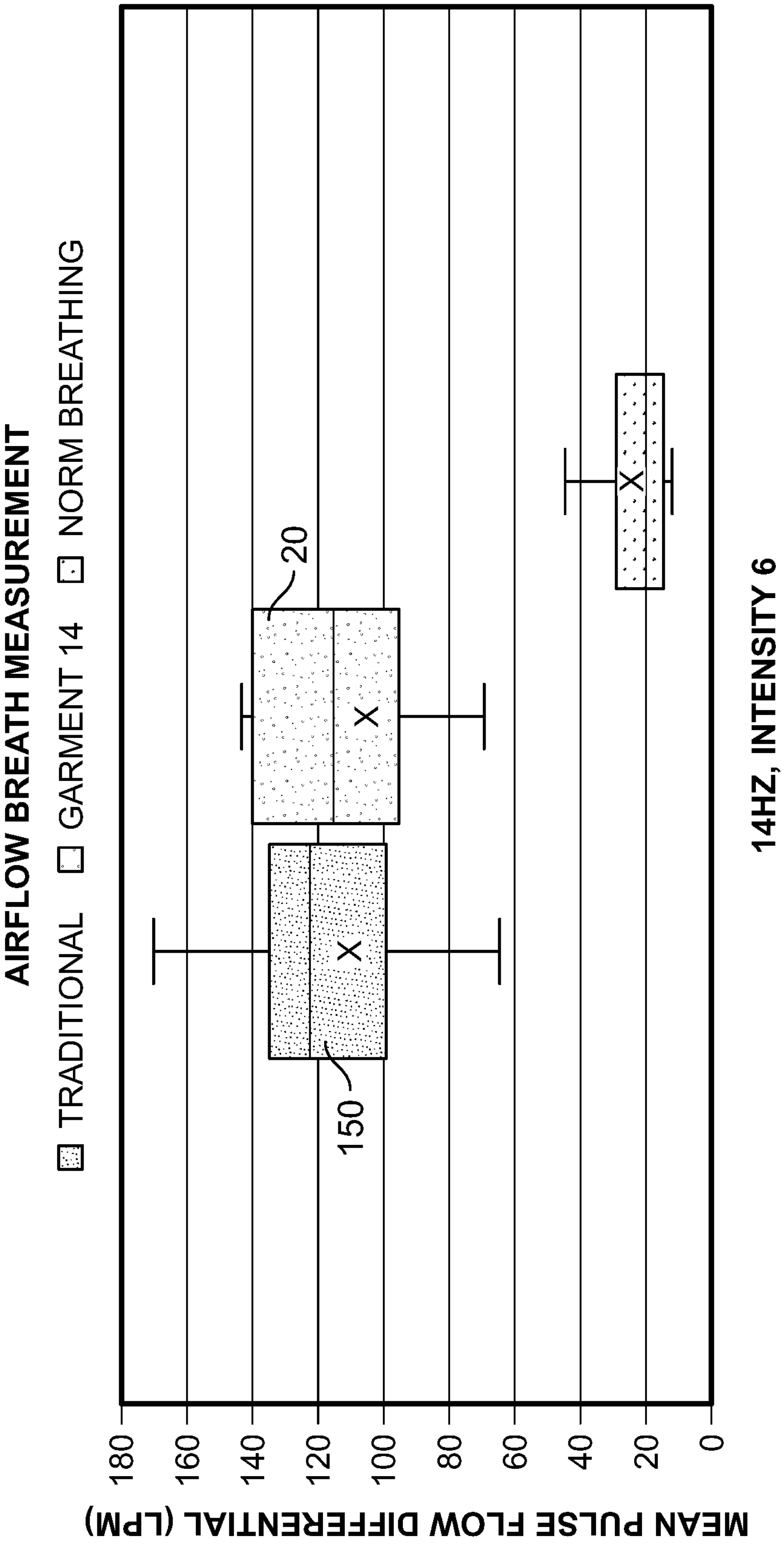
FIG. 8 is a graphical depiction of airflow breath measurement of each of the fluid bladder, conventional bladder, of FIG. 7, and normal breathing.

By comparison, as shown in FIG. 8, the garment 14 including the fluid bladder 20 yielded a commensurate mean airflow breath volume, within about three percent of the conventional fluid bladder 150 while employing about 40% less bladder volume. Such unexpected results of reducing the overall bladder volume while maintaining mean airflow breath volume can promote comfort to the patient by avoiding transfer of percussive force to less productive areas for therapy. Moreover, more conforming fit can be achieved with lower volume bladders, enhancing the effectiveness and/or efficiency of HFCWO therapy.

Table 1 indicates various testing information comparing performance of the fluid bladder 20 with the conventional bladder 150.

TABLE 1

| Mean Pulse Flow Differential (Liter/Min) | | | | |
|---|---|---|---|---|
| Subject | Conventional | Fluid Bladder 20 | Normal Breathing | |
| 1 | 140.1465 | 139.0771 | 23.8679 | Diff |
| 2 | 111.1709 | 123.7659 | 36.9507 | |
| 3 | 121.7429 | 128.4838 | 44.2614 | |
| 4 | 104.9752 | 76.4787 | 11.6362 | |
| 5 | 93.281 | 92.5934 | 14.2609 | |
| 6 | 127.771 | 108.181 | 16.5499 | |
| 7 | 133.6 | 142.9 | 20.24 | |
| 8 | 170.1 | 1341.2 | 19.05 | |
| 9 | 126.4 | 117.3 | 26.17 | |

TABLE 1-continued

| Mean Pulse Flow Differential (Liter/Min) | | | | |
|---|---|---|---|---|
| Subject | Conventional | Fluid Bladder 20 | Normal Breathing | |
| 10 | 135.1 | 140.3 | 22.7 | |
| 11 | 98.42 | 96.39 | 30.9 | |
| 12 | 64.57 | 69.19 | 12.88 | |
| 13 | 100.6 | 99.56 | 14.58 | |
| MEAN | 117.5 | 113.5 | 22.62 | 3% |
| STD DEV | 26.27 | 25.216 | 9.8394 | |
| Median | 121.743 | 117.292 | 20.2413 | |
| Volume | 24.6 | 14.6 | n/a | 41% |

Figure 9:
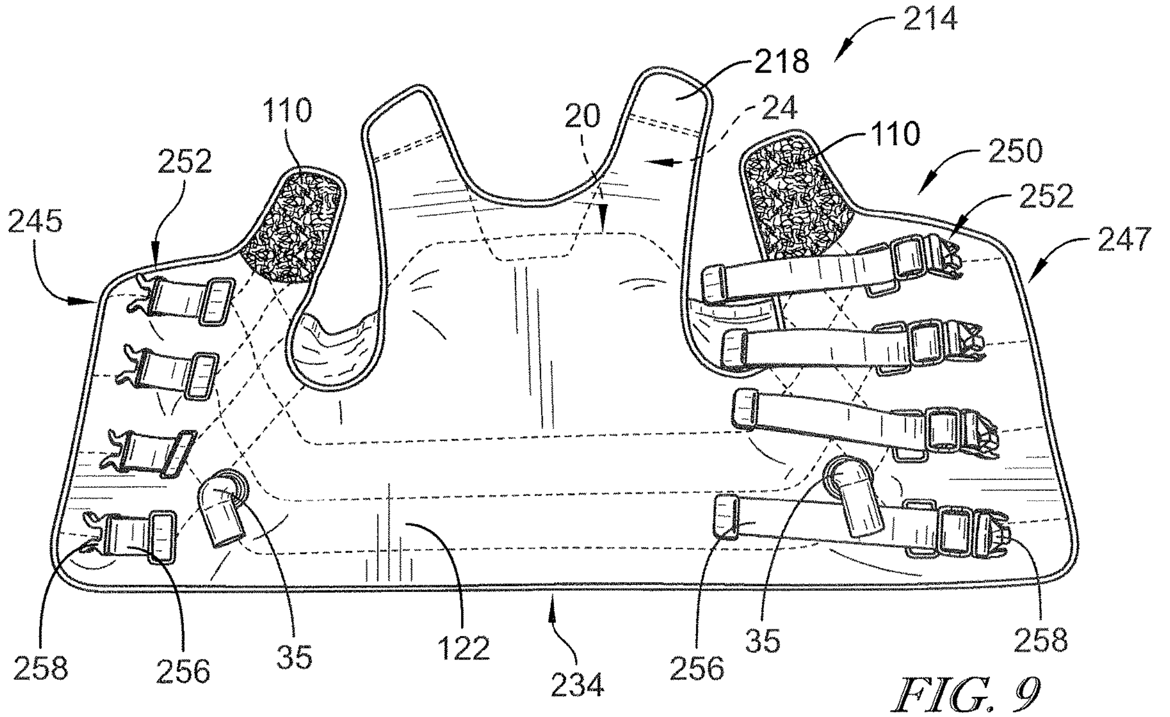
FIG. 9 is a rear elevation view of another embodiment of the therapy garment of the HFCWO system of FIG. 1 including the fluid bladder of FIG. 2, but having another covering.
Figure 10:
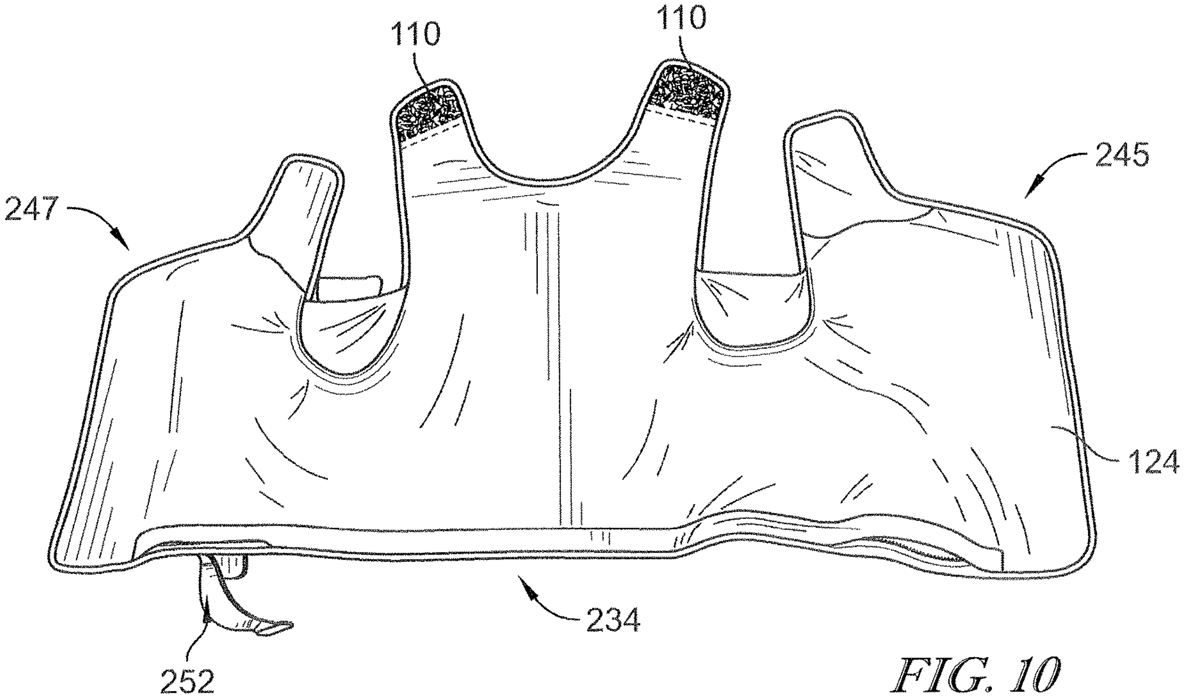
FIG. 10 is a front elevation view of the therapy garment of FIG. 9.

Referring now to FIGS. 9 and 10, another embodiment of a therapy garment 214 is shown including the fluid bladder 20 within another covering 218. The therapy garment 214 is similar to therapy garment 14, and the disclosure of therapy garment 14 applies equally to the therapy garment 214, except in instances of conflict with the specific disclosure of therapy garment 214.

The therapy garment 214 includes a covering 218 which defines the bladder pocket 24 housing the fluid bladder 20. The covering 218 includes a connection system 250 comprising a number of male connectors 252 and corresponding female connectors 254. The male connectors 252 are illustratively connected with the wing 247 and the female connectors are illustratively connected with the wing 245. The connectors 252, 254 are configured for selective connection together to secure the therapy garment about the patient's torso.

Each of the male and female connectors 252, 254 include a strap 256 secured with the corresponding wing 245, 247 and a connector member 258 having the appropriate male or female configuration for receiving connection with the corresponding connector of the opposite wing 245, 247. The strap 256 of each connector 252, 254 is adjustable to encourage comfortable and conforming fit to the patient's torso.

In the illustrative embodiment, the male and female connectors 252, 254 are embodied as snap buckles allowing pressed fitting together to snap releasable connection between their corresponding parts. In some embodiments, the connectors 252, 254 may have any suitable form and/or arrangement for securing the therapy garment about the patient's torso, for example, but without limitations, male and female connectors 252, 254 may be secured with the wings 245 and 247 respectively.

Figure 11:
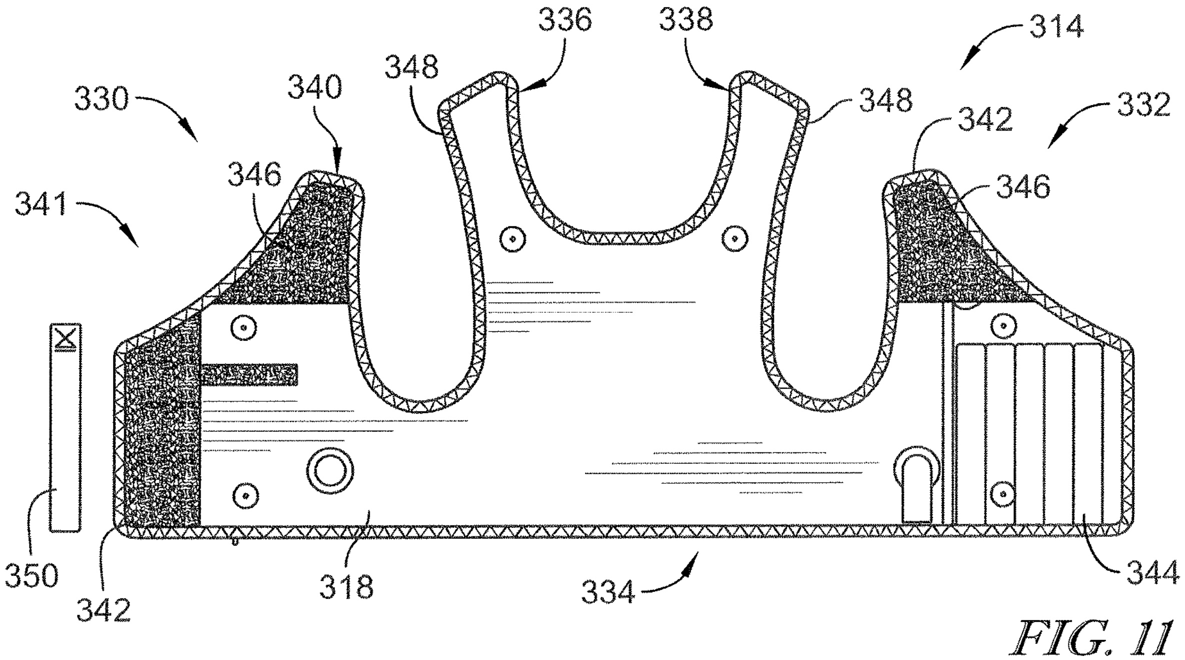
FIG. 11 is a rear elevation view of another embodiment of the therapy garment of the HFCWO system of FIG. 1.

Referring now to FIG. 11, another embodiment of a therapy garment 314 is shown including another covering 318 and another fluid bladder 320. The therapy garment 314 is similar to therapy garments 14, 214 and the disclosure of each of the therapy garments 14, 214 applies equally to therapy garment 314, except in instances of conflict with the specific disclosure of therapy garment 314.

The therapy garment 314 includes a central region 334 and wings 330, 332 extending from opposite lateral sides of the central region 334. The therapy garment 314 can wrap around the patient's torso to engage the patient's chest and back near the rib cage to apply HFCWO therapy.

The covering 318 includes a number of fastener sections 341 for securing the therapy garment 314 about the patient's torso. The fastener sections 341 includes complementary sections 342, 344 arranged on opposite ones of the wings 330, 332, and corresponding sections 346, 348 arranged on corresponding shoulder strap 336, 338 and lower strap portions 340, 342.

The fastener sections 341 are illustratively embodied as complementary hook-and-loop fasteners permitting selective and adjustable engagement and disengagement between the corresponding sections. Adjustable engagement between the corresponding portions (e.g., between 342, 344 and 330, 332, respectively, and/or between 336, 338 and 340, 342, respectively, can encourage complementary fit of the therapy garment 314 with the patient's torso. A strap 350, shown separated from the covering 18, can be connected (for example, sewn) with the covering 18 as a strap to promote user's ease in securing the therapy garment 314 about the patient's torso, for example, as a pull strap to apply strong force in closing the therapy garment 314 about the torso.

Figure 12:
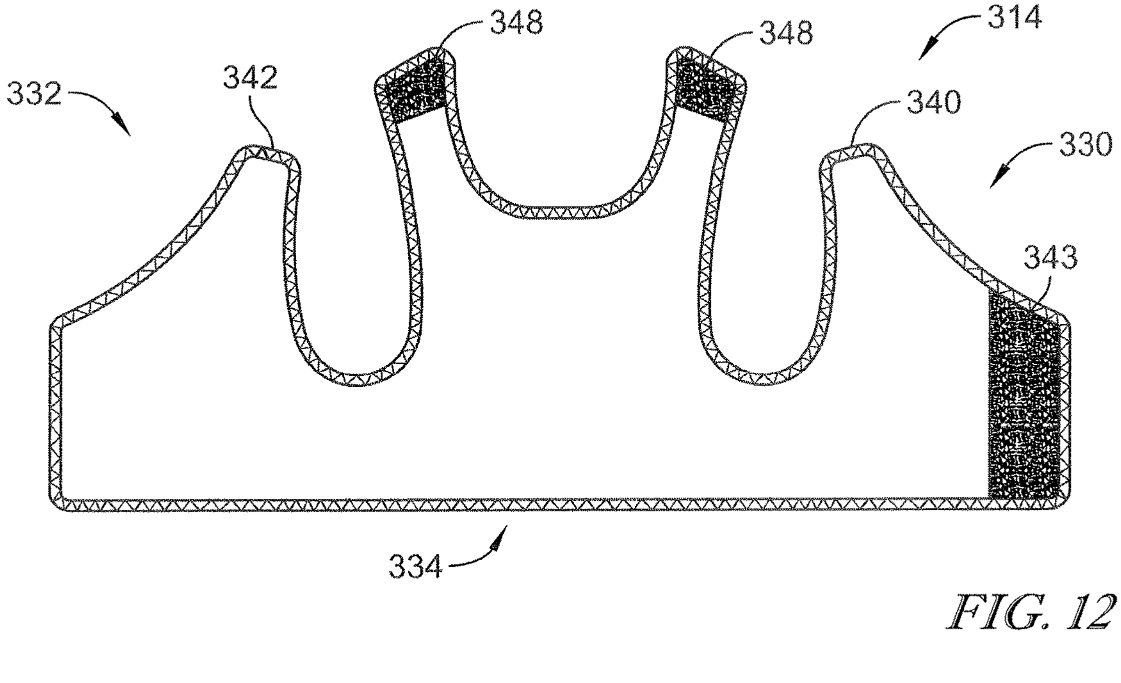
FIG. 12 is a rear elevation view of the therapy garment of FIG. 11.

As shown in FIG. 12, the fastener section 343 is arranged on an inner sides of the wing 330. The fastener section 343 arranged on the inner side of the covering 318 (as shown in FIG. 12) is arranged to engage with the complementary portion 344 on the outer side of the wing 330. The portion of fastener section 342 on the outer side of the covering (as shown in FIG. 11) can be engaged with an inner facing complementary portion arranged on a flap (not shown), similar to flap 92 of therapy garment 14.

Figure 13:
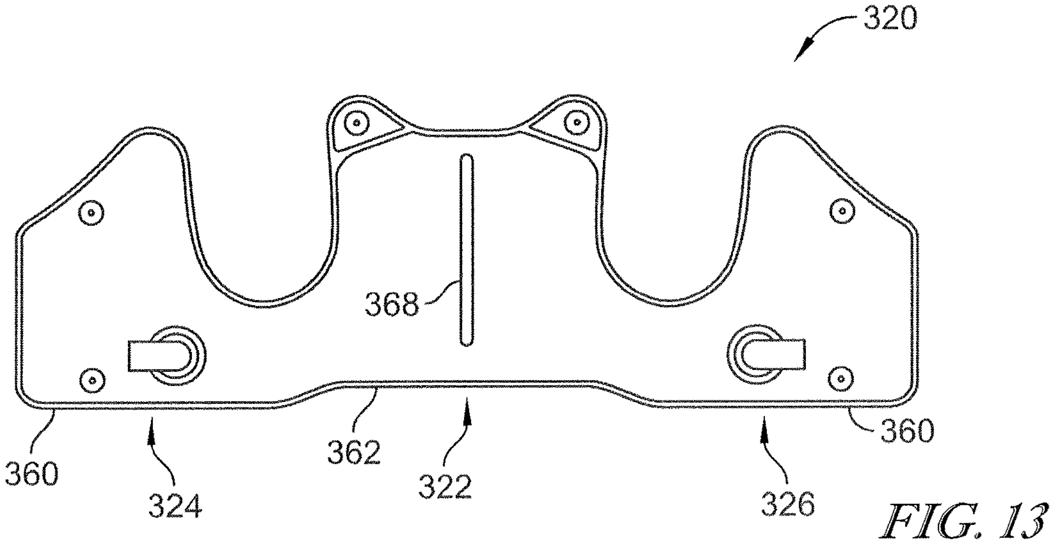
FIG. 13 is a front elevation view of a fluid bladder of the therapy garment of FIG.

Referring to FIG. 13, the fluid bladder 320 is shown in isolation. The fluid bladder 320 illustratively includes a central portion 322 and wings 324, 326 each corresponding with the central portion 334 and wings 330, 332 of the covering 318, respectively. The fluid bladder 320 defines a lower edge 360, 362 including wing edge portions 360 and central edge portion 362. The central edge portion 362 defines a recessed profile retracted from the wing edge portions 360. The recessed profile permits desirable HFCWO engagement while reducing impact to areas of the patient's body less productive in expectoration, for example, beyond the patient's lung profile and/or at the edge of the patient's lung profile.

The fluid bladder 320 includes a fluid restriction 368, formed as a weld seam. The fluid restriction 368 is arranged to correspond with the patient's spine to prevent fluid from entering the space of the chamber 22 within the fluid bladder 320 at that location. Avoiding fluid at the patient's spine can increase comfort by decreasing impact force at that location.

Figure 14:
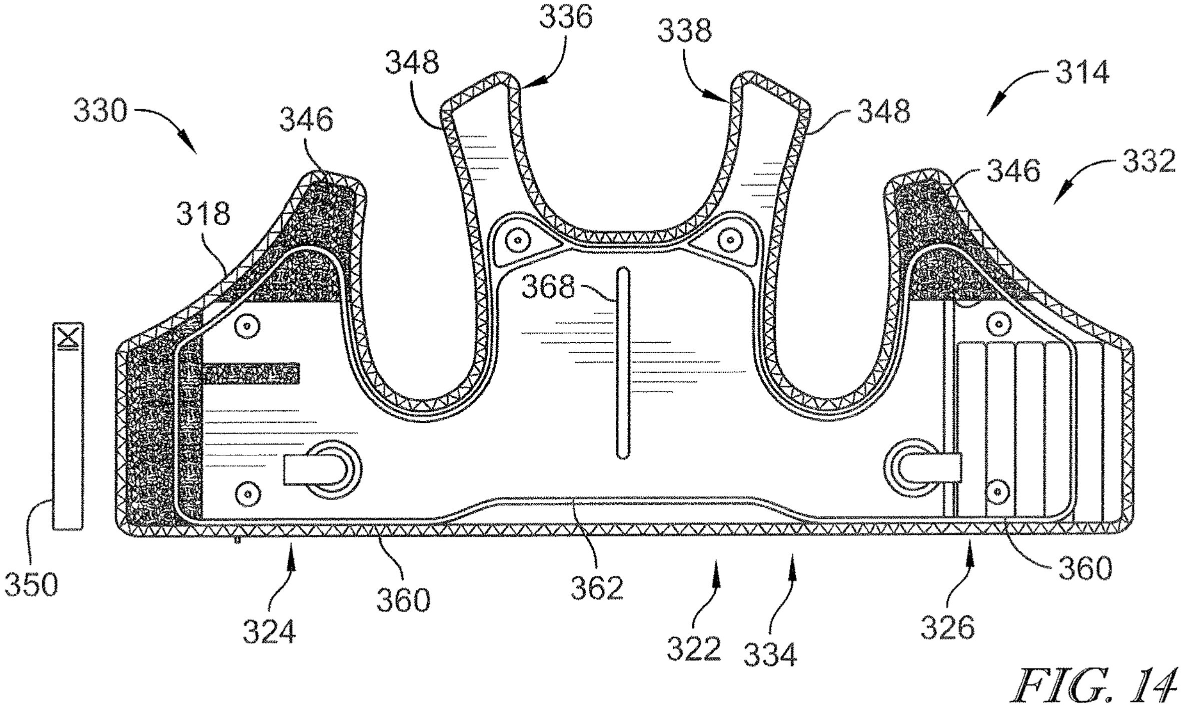
FIG. 14 is the rear perspective view of the therapy garment of FIG. 11 rendered partly transparent to reveal the fluid bladder of FIG. 13 within.

In FIG. 14, the therapy garment 314 is shown with the covering 318 rendered effectively transparent to illustrate the fluid bladder 320 arranged therein. The wings and central portions of each of the covering 318 and fluid bladder 320 can be seen to correspond in position. respectively.

Referring now to FIGS. 15-21, another embodiment of a therapy garment 414 is shown including another covering 418 and another fluid bladder 420 arranged therein. The therapy garment 414 is similar to therapy garments 14, 214, 314 and the disclosure of each of the therapy garments 14, 214, 314 applies equally to therapy garment 414, except in instances of conflict with the specific disclosure of therapy garment 414.

Figure 15:
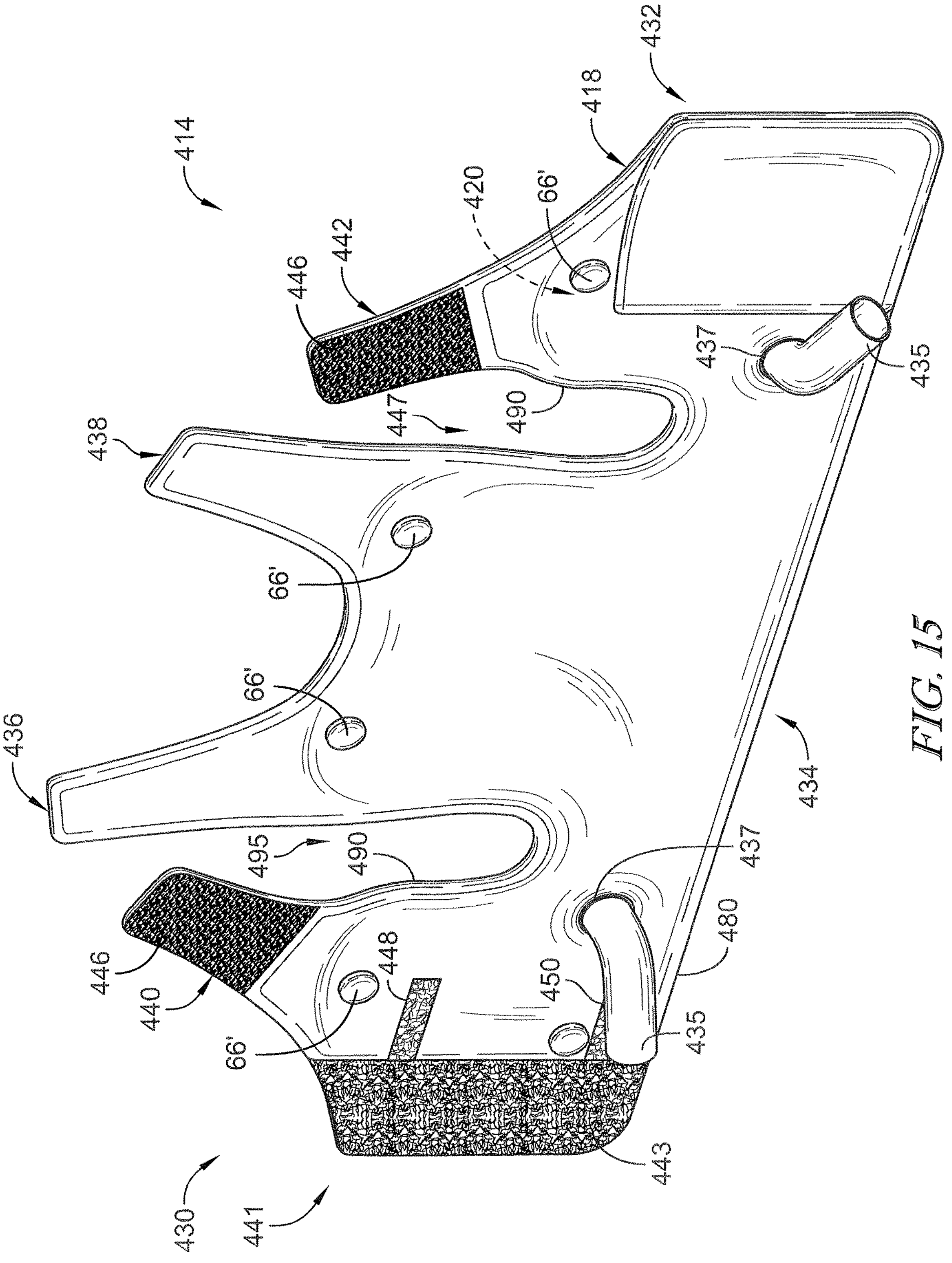
FIG. 15 is a perspective view of another embodiment of a therapy garment of the HFCWO system of FIG. 1.
Figure 16:
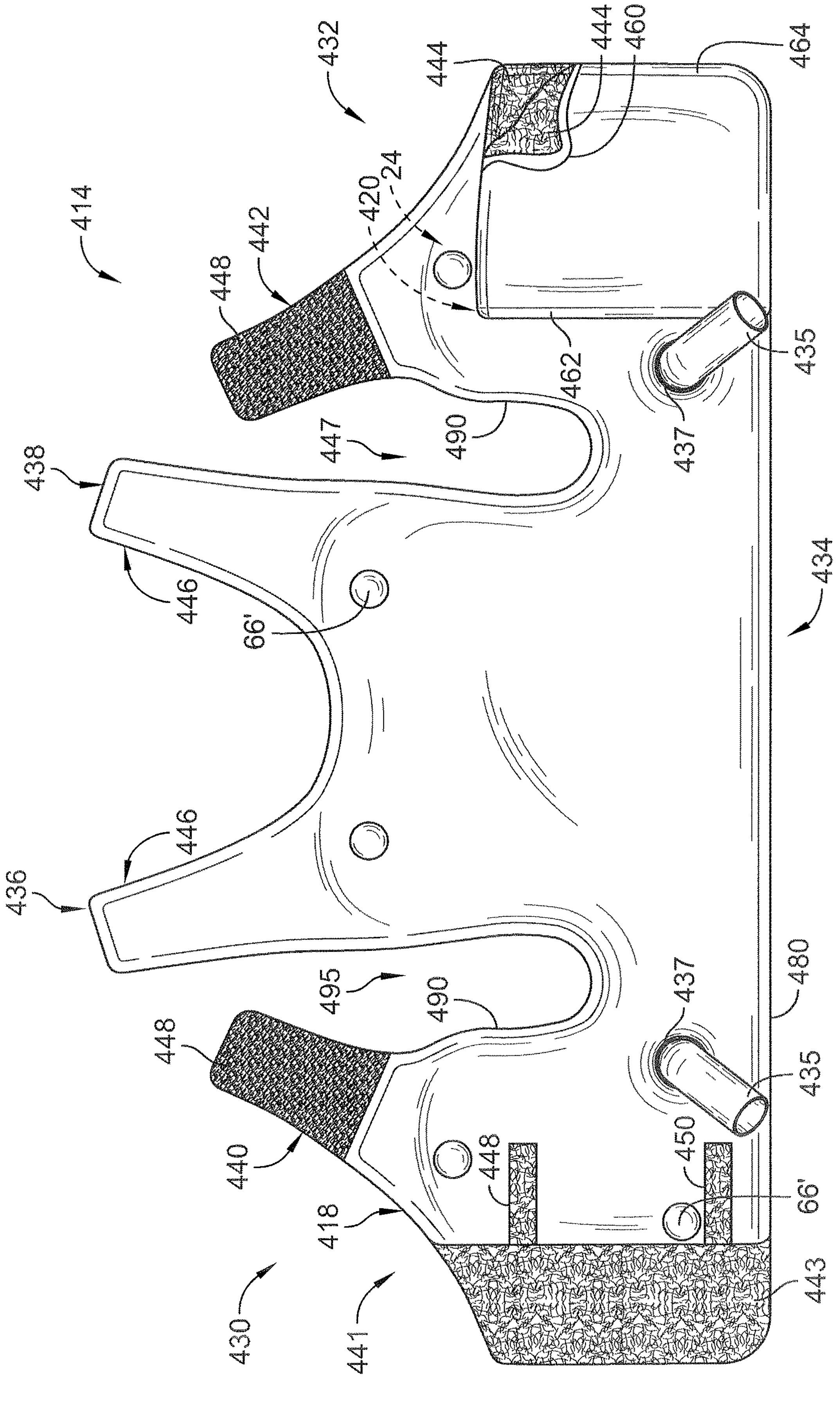
FIG. 16 is a rear elevation view of the therapy garment of FIG. 15.

The therapy garment 414 includes a central region 434 and wings 430, 432 extending from opposite lateral sides of the central region 434. The therapy garment 414 can wrap around the patient's torso to engage the patient's chest and back near the rib cage to apply HFCWO therapy. As shown in FIGS. 15 and 16, the therapy garment 414 includes hose connections 435 for receiving pressurized air from the force generator to provide HFCWO therapy. Hose connections 435 are pneumatic connectors that are illustratively embodied as tubular elbow connectors in pneumatic communication with an interior region of bladder 420. The illustrative elbow connectors 435 are each bent at a 60 degree angle between opposite ends of the elbow connectors.

The covering 418 includes a number of fastener sections 441 for securing the therapy garment 414 about the patient's torso. The fastener sections 441 include complementary sections 443, 444 arranged on opposite ones of the wings 430, 432, and corresponding sections 446, 448 arranged on corresponding shoulder strap 436, 438 and lower strap portions 440, 442. The complementary sections 444 are illustratively arranged covered by the flap 460.

Figure 17:
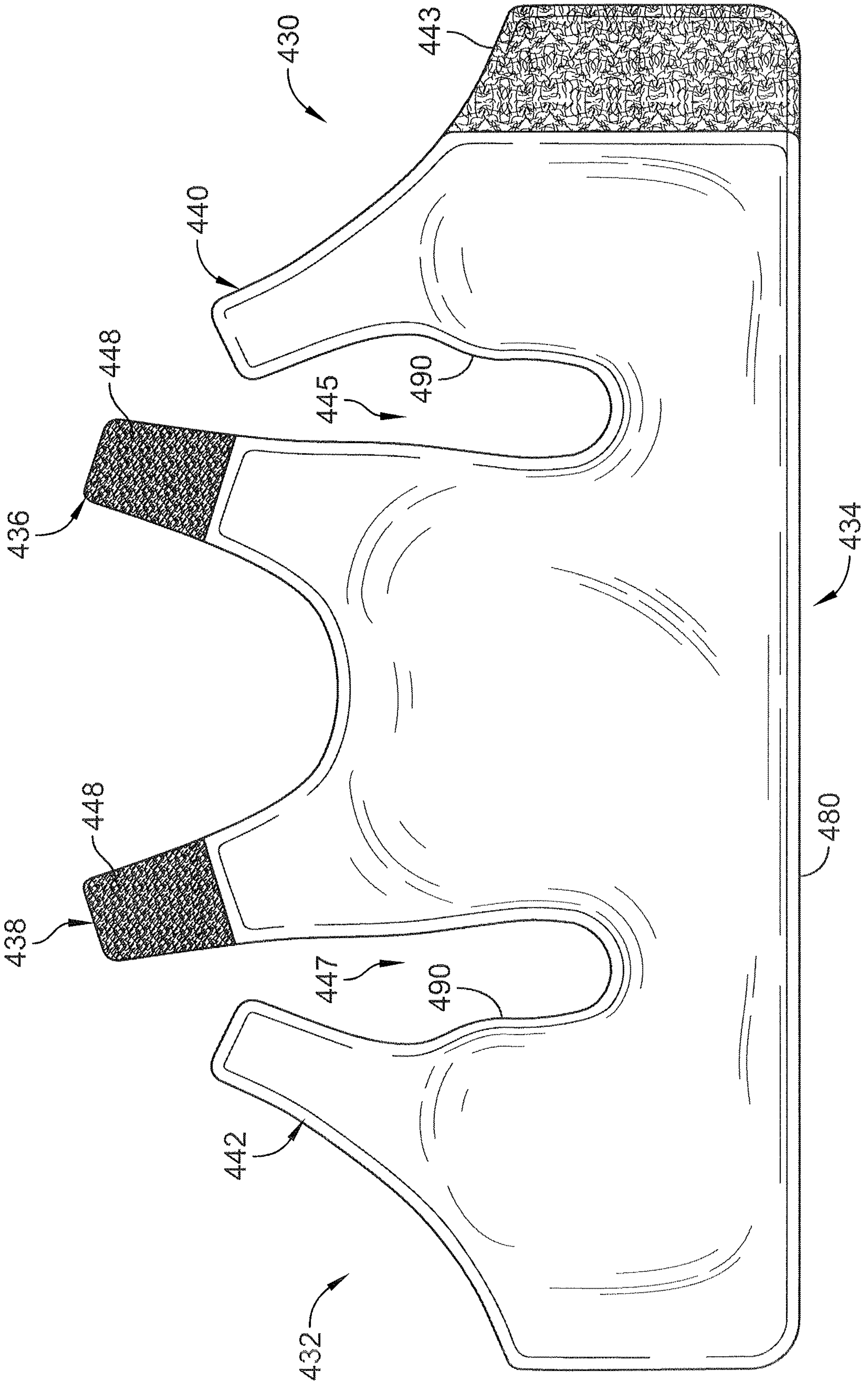
FIG. 17 is a front elevation view of the therapy garment of FIGS. 15 and 16.
Figure 18:
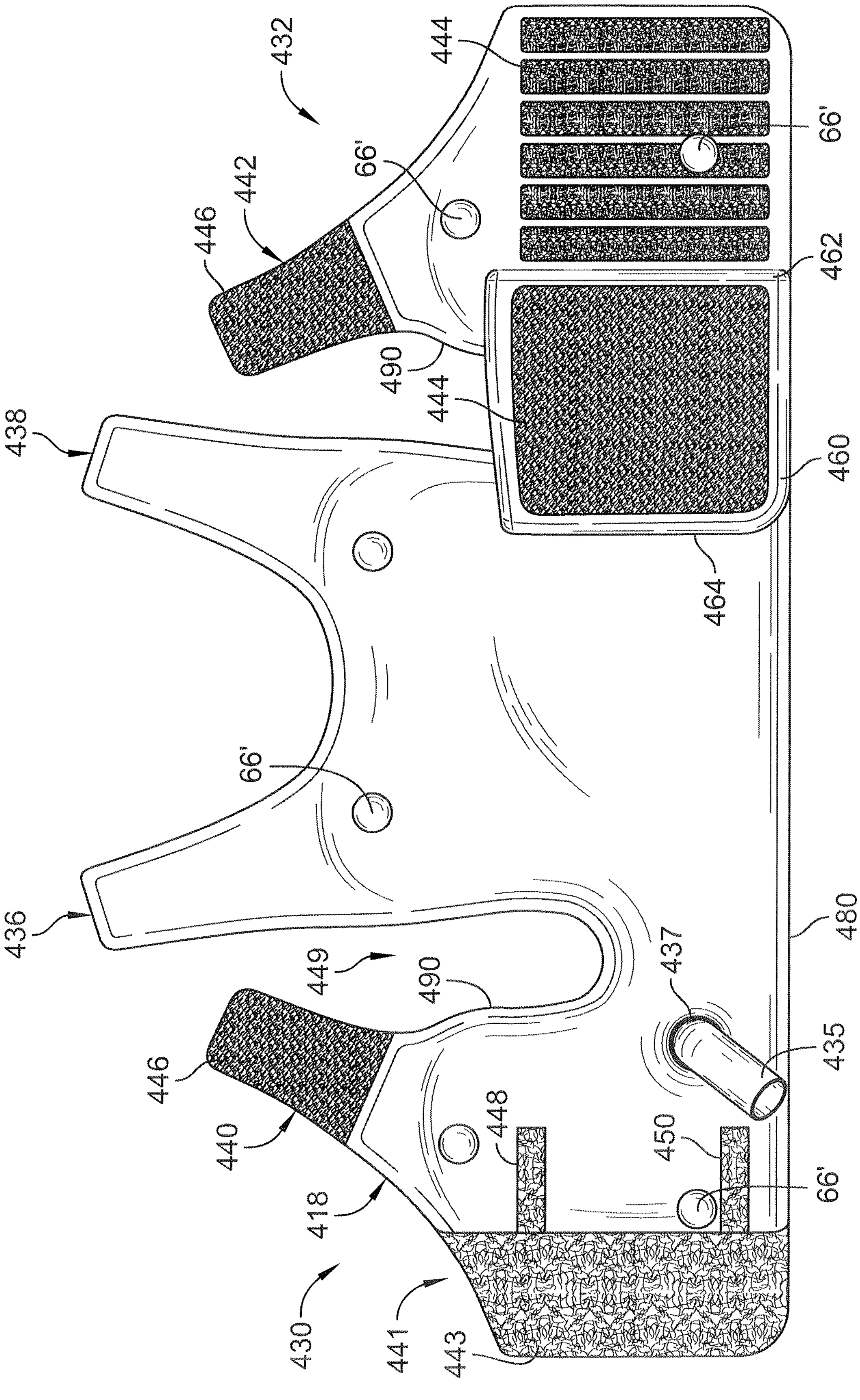
FIG. 18 is the perspective view of FIG. 15 showing that a flap of the garment is folded back to reveal a fastening system.

As shown in FIG. 16 (and FIG. 18), a portion of the flap 460 is peeled back to reveal that one complementary section 444 is arranged on the inside surface of the flap 460 itself for corresponding engagement with the complementary section 443 on the exterior of the wing 430. Another complementary section 444 is arranged on the exterior surface of the wing 432, within the flap 460, for corresponding engagement with the complementary section 443 on the interior surface of the flap 430 (as shown in FIG. 17). The flap 460 at one end 462 is secured with a lower portion of the wing 432 and extends to another end 464 that is a free end. The flap 460 and wing 432 can thus sandwich the end of the wing 430 to provide additional engagement between the wings 430, 432 when the flap 460 is in a closed position. As also shown in FIG. 18 flap 460 overlies one of the pneumatic connectors 435 of the pair of pneumatic connectors 435 when flap 460 is in a fully opened position.

The fastener sections 441 are illustratively embodied as complementary hook-and-loop fasteners permitting selective and adjustable engagement and disengagement between the corresponding sections. Adjustable engagement between the corresponding portions (e.g., between 430, 432 (via 443, 444, respectively), and/or between 436, 438 and 440, 442, respectively, can encourage complementary fit of the therapy garment 314 with the patient's torso. The fastener sections 441 illustratively include extension strips 448, 450 extending from the section 443 towards the central portion 434 on the exterior surface of the covering 418. The extension strip 450 is arranged on the wing 430 near the lower edge 480 of the covering 418.

The extension strip 448 is illustratively arranged higher on the wing 430 near the lower strap portion 440. The extension strip 448 is illustratively arranged vertically spaced apart from the strip 450, within the height of the flap 460 for engagement with the complementary section 444 arranged on the inside surface of the flap 460.

The covering 418 illustratively includes a bulbous portion 490 projecting from the interior edge of each wing 430, 432 into an arm opening 445, 447 defined between each wing 430, 432 and the central region 434 to receive the patient's arm therethrough. The arm openings 445, 447 are defined partly by the shoulder strap 436, 438 and corresponding lower strap portion 440, 442, and are enclosed around the patient's arms when the shoulder straps 436, 438 are engaged with the lower strap portions 440, 442.

Each bulbous portion 490 diverges from the natural curvature of the covering 418 defining the arm openings 445, 447 to accommodate complementary curvature in the fluid bladder 420. Each bulbous portion 490 divides the respective arm opening 445, 447 into a lower opening 492 and an upper opening 494, each lower opening 492 defining a generally uniform opening width between the wing 430, 432 and the central portion 434 and each upper opening 494 defining a generally tapered opening width narrowing along its extension between the bulbous portion and the free end of the lower strap portion 440, 442.

Figure 19:
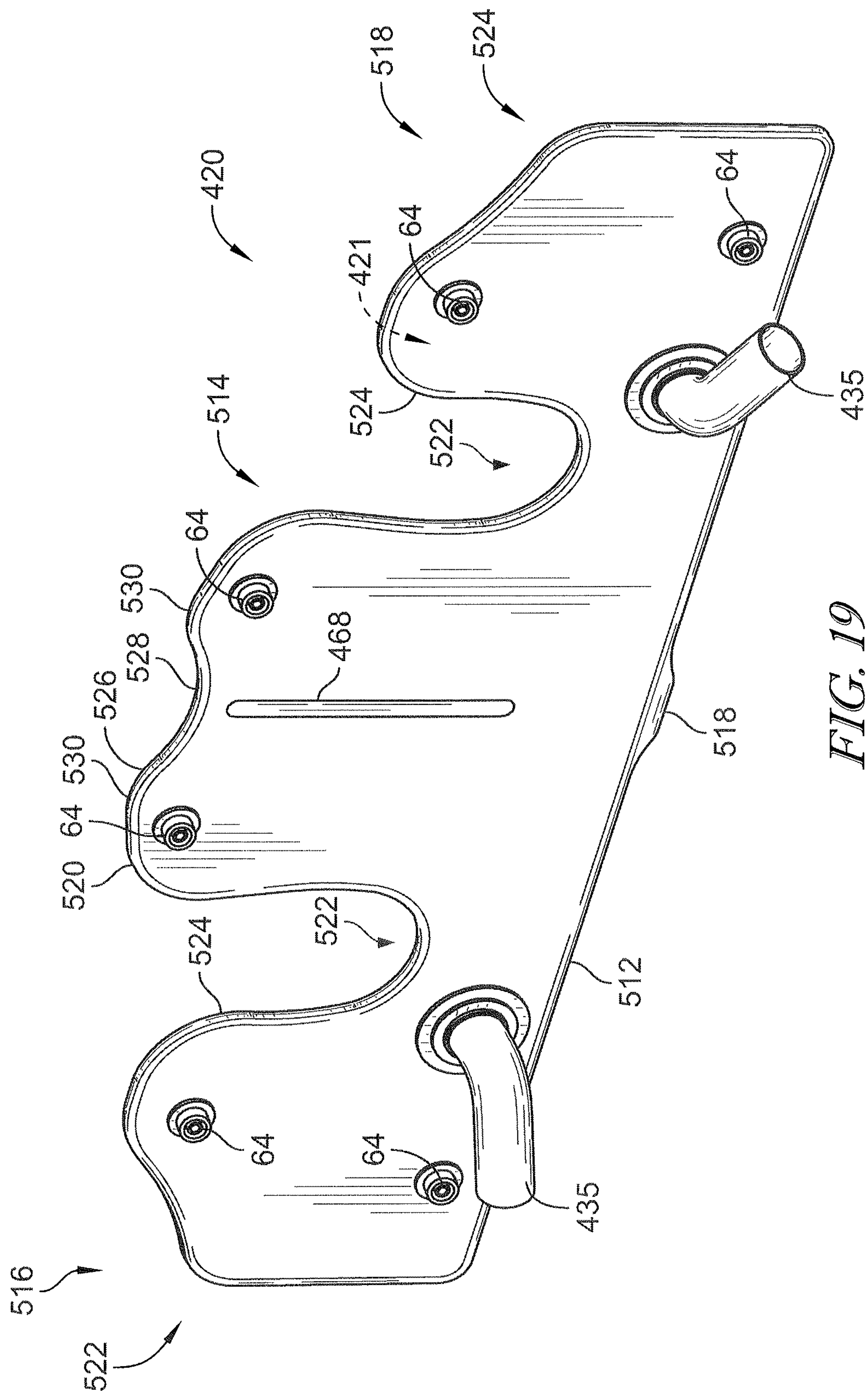
FIG. 19 is a perspective view of a fluid bladder of the therapy garment of FIG. 15.
Figure 20A:
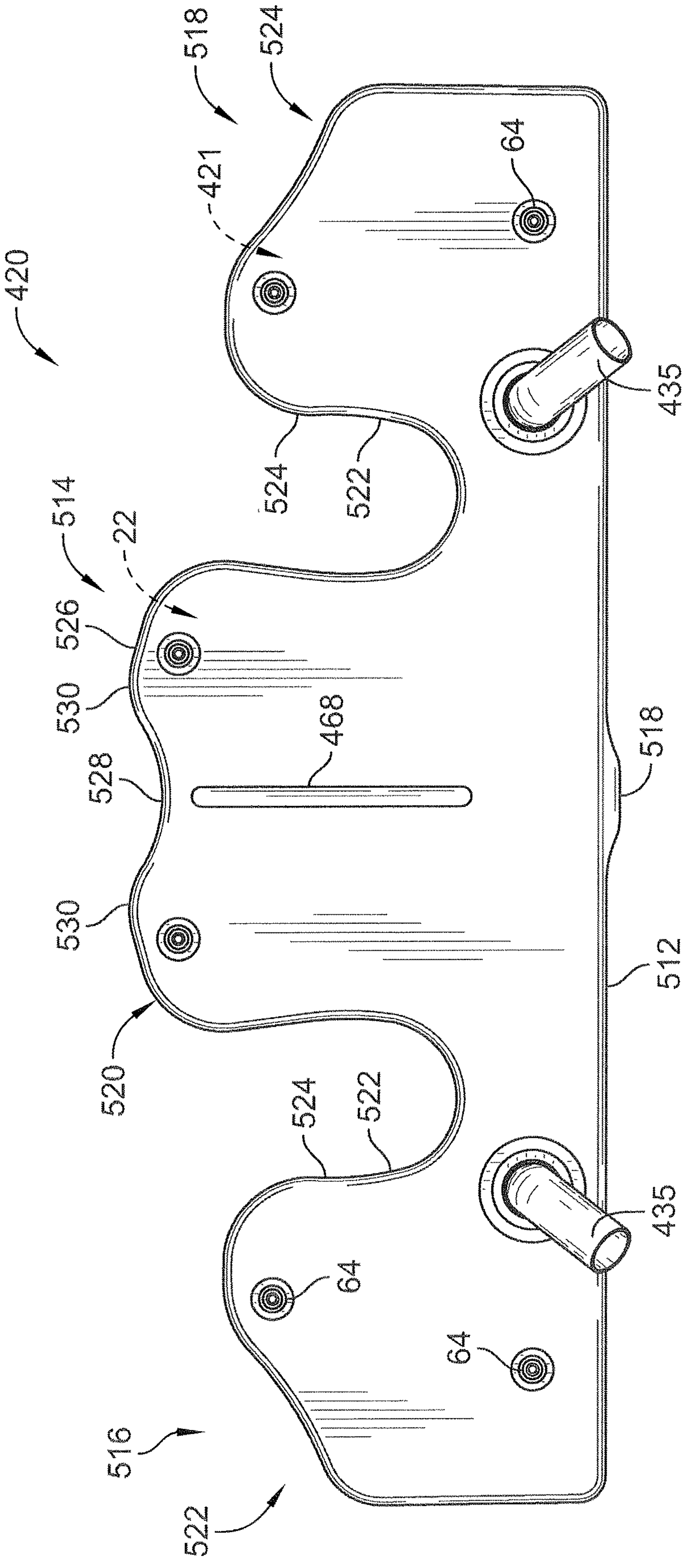
FIG. 20A is a rear elevation view of the fluid bladder of FIG. 19.
Figure 20B:
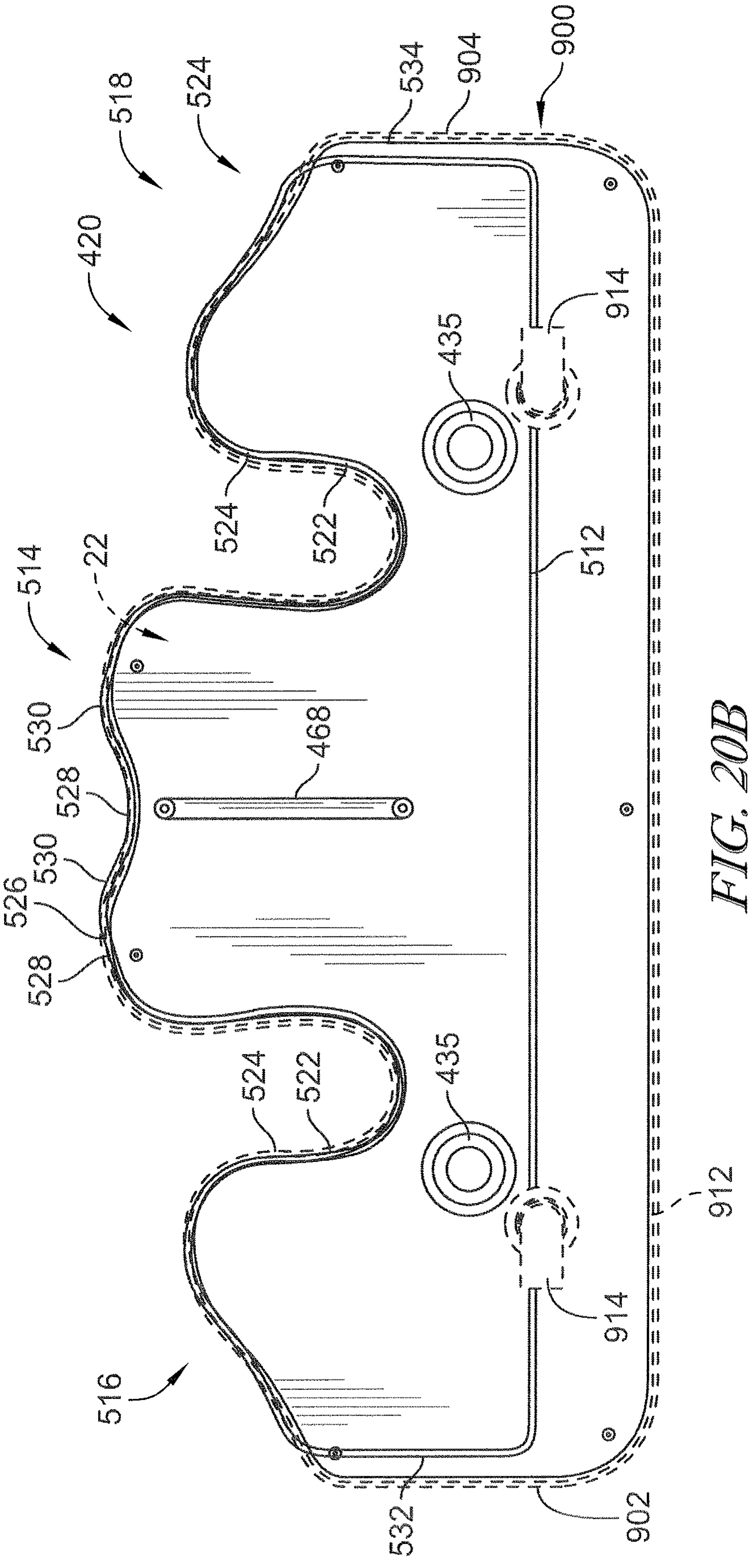
FIG. 20B is a rear elevation view of the fluid bladder of FIG. 20A overlaid onto a conventional fluid bladder.
Figure 21:
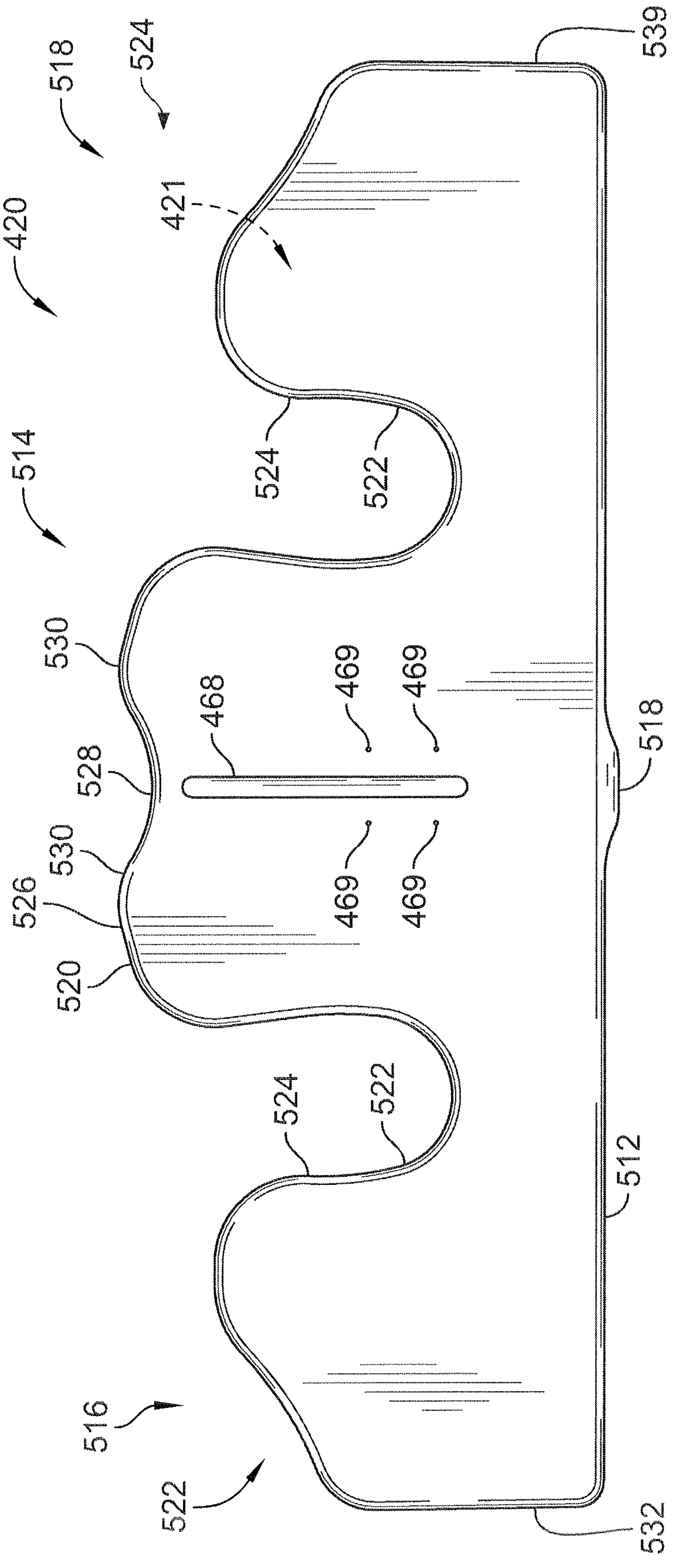
FIG. 21 is a front elevation view of the fluid bladder of FIGS. 19 and 20A.

Referring now to FIGS. 19-21, the fluid bladder 420 is shown generally isolated for ease of description. The fluid bladder 420 defines a pressurizable chamber 421 therein for receiving pressurized fluid. The chamber 421 is illustratively formed collectively within each of the wing 430, 432 and central portions 434. The chamber 421 is illustratively arranged in fluid communication with the hose connections 435 for receiving fluid from the force generator. When the fluid bladder 420 is arranged within the bladder pocket of the covering 418, the hose connections 435 extend through openings 437 in the outer layer of covering 418 for engagement with, or coupling to, hoses 17 to communicate fluid from the force generator 16 to the fluid bladder 420 for HFCWO therapy.

As shown in FIGS. 19-20A, the fluid bladder 420 includes an outer profile shaped to correspond closely with patient's rib cage, and more specifically, the effective respiratory therapy area of the patient's chest wall. The outer profile of the fluid bladder 20 includes a lower edge portion 512 arranged to correspond with the lower extent of the patient's rib cage between lateral ends of the bladder 420.

The fluid bladder 420 includes the central portion 514 and wings 516, 518 corresponding to the wings 430, 432 of the covering 418. The lower edge portion 512 is illustratively defined collectively by the lower edge of the wings 516, 518 and central portion 514 of the fluid bladder 420. The fluid bladder 410 includes a tab 518 extending from the lower edge portion 512 defined as a flow restriction allowing no fluid to pass therein, to assist manipulation and/or fastening of the fluid bladder 420 within the covering 418. The tab 518 is illustratively arranged to extend from the lower edge portion 512 at a central location defined by the central portion 514. The fluid bladder 420 includes a fluid restriction 468, formed as a weld seam. The weld seams contemplated herein include, for examples, seams formed by sonic welding or radio frequency (RF) welding. The fluid restriction 468 is arranged to correspond with the patient's spine to prevent fluid from entering the space of the chamber 22 within the fluid bladder 420 at that location. Avoiding fluid at the patient's spine can increase comfort by decreasing impact force at that location.

The outer profile of the fluid bladder 420 includes an upper edge portion 520 arranged to correspond with the upper extent of the patient's rib cage between lateral ends of the bladder 420. The upper edge portion 520 is collectively defined by the upper edge of the wings 516, 518 and central portion 514 of the fluid bladder 420.

The upper edge portion 520 illustratively outlines the wings 516, 518 along the lateral ends 522, 524 of the fluid bladder 420. The upper edge portion 520 includes arm opening portions 522 defining arm openings of the fluid bladder 420 corresponding with the arm openings 445, 447 of the covering 418.

The arm opening portions 522 of the upper edge portion 520 each define a bulbous portion 524 corresponding with the bulbous portion 490 of the covering 418. The bulbous portions 524 define maxima in the curvature of the profile at the arm opening portions 522. Each bulbous portion 524 projects across the patient's pectoral near the patient's arm pit to encourage efficient transfer of force of oscillation to the patient's chest wall.

The upper edge portion 520 includes a central edge portion 526 defined along the upper edge of the central portion 514. The central edge portion 526 includes a spine recess 528 avoiding additional engagement with the patient's spine, and peak portions 530 defined on either lateral side of the spine recess 528. The peak portions 530 extend upward to engage with the patient's back to the extent of the respiratory cavity while the spine recess avoids excessive impact on the spine itself.

The fluid bladder 420 includes a number of snaps 64 having complementary receivers 66 on the interior of the bladder pocket 24 of the covering 418. The snaps 64 are received by the receivers 66 for pressure fit engagement to form a releasable connection between the fluid bladder 420 and the covering 418. The corresponding snaps and receivers 64, 66 selectively connect together to maintain the position of the fluid bladder 420 within the bladder pocket 24. Associated with each receiver 66 is a snap button 66' accessible on the exterior of covering 418 as shown in FIGS. 15, 16, and 18. Snap buttons 66' are pressed by a user or clinician to force the corresponding receivers 66 onto the companion snaps 64 of bladder 420.

Based on the foregoing, it should appreciated that the fluid bladder 420 is selectively insertable into and removable from a bladder pocket defined between inner and outer layers of garment or covering 418. After insertion of bladder 420 into the bladder pocket, pneumatic connectors 435 are pushed through openings 437 in the outer layer of garment 418 so that the pneumatic connectors 435 extend through a respective one of the openings 437 to assist in properly aligning the fluid bladder 420 within the bladder pocket after the fluid bladder is inserted therein. Furthermore, snap receivers 66 are coupled to snaps 64 via use of snap buttons 66' to further assist in properly aligning the fluid bladder 420 within the bladder pocket after the fluid bladder 420 is inserted therein. Therefore, the outer layer of the garment 418 has a first set of fasteners (e.g., snap receivers 66 in the illustrative example) within the bladder pocket and the fluid bladder 420 has a second set of fasteners (e.g., snaps 64 in the illustrative example) that couple together to further assist in properly aligning the fluid bladder 420 within the bladder pocket after the fluid bladder 420 is inserted therein.

Referring to FIG. 20B, the fluid bladder 420 is shown in solid line overlaid on a conventional fluid bladder 900 in broken line. Notably, the lower edge portion 512 is retracted. For example, the lower edge portion 512 is positioned considerably higher that a lower edge 912 of the conventional fluid bladder 900, reducing the total surface of engagement with the patient, but targeting the highly effective area of the rib cage.

Additionally, the hose connections 435 of the fluid bladder 420 are positioned higher and more centrally than the hose connections 914 of the conventional fluid bladder 900. Also notable, the lateral ends of the fluid bladder 420, and specifically, lateral edges 532, 534 of the fluid bladder 420 are shorten relative to the lateral ends, and specifically the lateral edges 902, 904, of the conventional fluid bladder 900.

Referring now to FIG. 21, an inner wall of fluid bladder 420 includes four air bleed holes 469. Air bleed holes 469 are separated by the fluid restriction 468. In the illustrative embodiment, there are four air bleed holes 469 with first and second pairs of air bleed holes 469 separated by the fluid restriction 468. The air bleed holes 469 allow for the escape of air from the pressurizable chamber 421 such as during a patient's inhalation in which the patient's rib cage is expanding, although it should be appreciated that while pressurizable chamber 421 is pressurized, it is possible for air leakage through bleed holes 469 to occur at other times as well.

Figure 22:
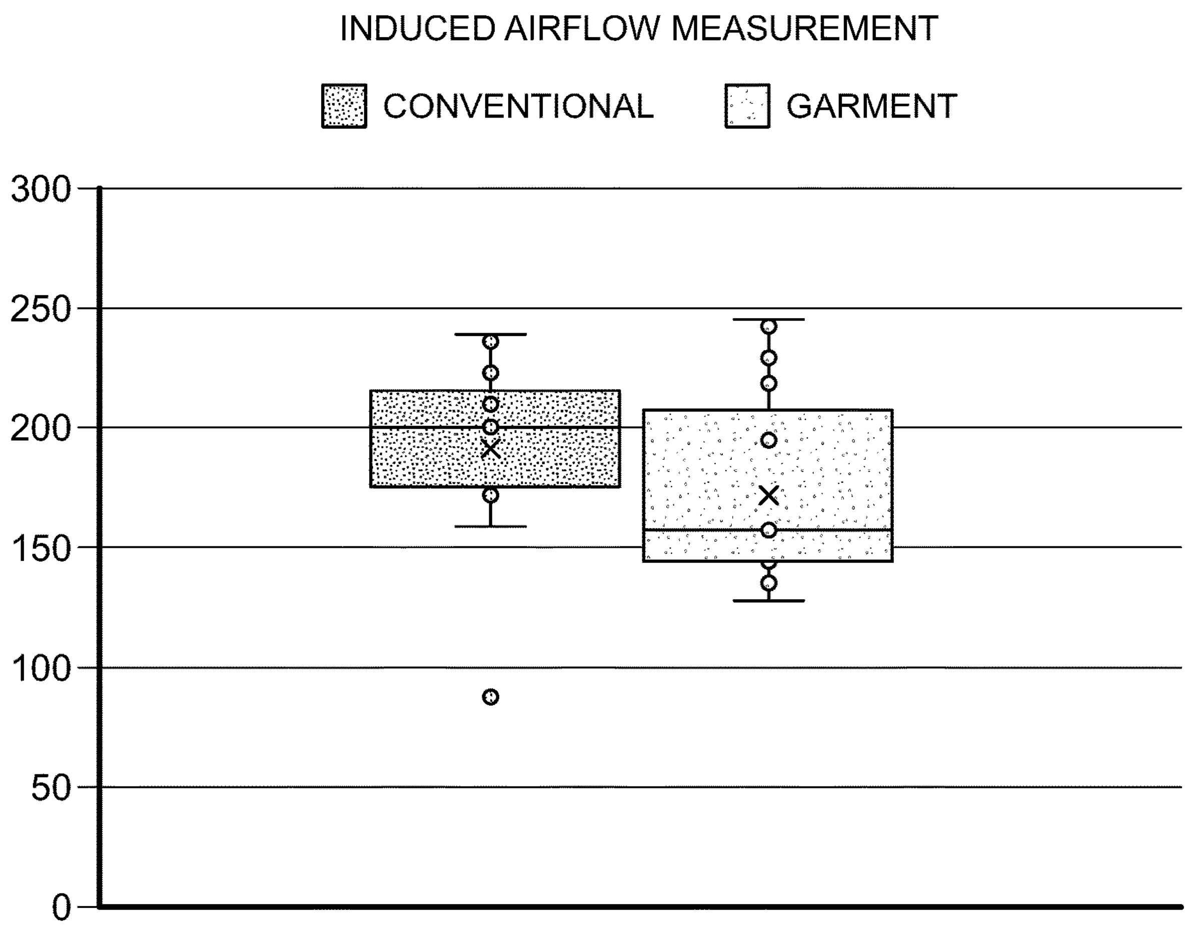
FIG. 22 is a plot of induced airflow comparing a HFCWO therapy garment having a conventional fluid bladder with the HFWCO therapy garment having the fluid bladder of FIGS. 15-22.

Referring now to FIG. 22, a comparison of airflow is shown between a therapy garment including the conventional fluid bladder and the garment 412 including the fluid bladder 420. FIG. 22 illustrates the airflow measurements of the conventional fluid bladder and the fluid bladder 420 of therapy garment 412.

As shown in Table 2, subjects were monitored for pulse airflow rate in liters per minute for each of the therapy garments having the conventional fluid bladder (indicated as "CON" in Table 1) and the fluid bladder 420 (indicated as "420" in Table 1). Monitoring was conducted during HFCWO therapy at a frequency of 14 Hz at an intensity level setting of 6. Notably, the airflow measurements remain close, with only a difference of about 11% in mean airflow rate. In the illustrative embodiment, the fluid bladder 420 has a volume that is about 49% less than that of the conventional fluid bladder 900.

TABLE 2

MEAN PULSE FLOW (LPM)

| | | Mean Pulse Flow (LPM) | |
|---|---|---|---|
| Subject | Initial | CON | 420 |
| 1 | AG | 190.38 | 157.74 |
| 2 | AN | 87.59 | 135.27 |
| 3 | BW | 189.02 | 144.00 |
| 4 | CH | 222.66 | 145.23 |
| 5 | HQ | 175.17 | 229.32 |
| 6 | JM | 206.54 | 170.49 |
| 7 | KP | 237.78 | 244.59 |
| 8 | PC | 173.19 | 144.74 |
| 9 | RY | 158.53 | 128.27 |
| 10 | SM | 199.37 | 162.16 |
| 11 | WS | 202.36 | 195.36 |
| 12 | YS | 200.09 | 142.93 |
| 13 | YW | 236.22 | 217.85 |
| Mean | | 190.68 | 170.61 |
| Std Dev | | 37.29 | 37.03 |
| Median | | 199.37 | 157.74 |

The reduction in effective pulse airflow was small compared with the amount of reduce volume reduction. Unexpectedly, the small reduction in pulse airflow despite large reduction in bladder volume demonstrates that the fluid bladder 420 of the therapy garment 412 provides increased efficiency in providing therapy force to the patient. Such effects may better target the important areas of the patient's thorax and/or central lung airway. Additionally, reducing the volume of the fluid bladder applied can increase patient comfort, generally, under the restrictive conditions of therapy garment based HFCWO therapy.

Within the present disclosure reduced volume relative to conventional fluid bladders may include reduction of volume from that of fluid bladders which would otherwise cover the entire rib cage area for the predominant number of patients, without regard to the effectiveness of coverage. Similarly, reduced volume while maintaining effective induced airflow may include maintaining effective HFCWO therapy for the predominant number of patients.

Although certain illustrative embodiments have been described in detail above, variations and modifications exist within the scope and spirit of this disclosure as described and as defined in the following claims.

We claim:

1. A high frequency chest wall oscillation (HFCWO) therapy garment comprising a garment for dressing on a patient's torso, the garment including an inner layer and an outer layer between which a bladder pocket is defined, the outer layer having a pair of openings therethrough, a fluid bladder insertable into and removable from the bladder pocket and defining a pressurizable chamber adapted to receive pressurized fluid to provide force of high frequency pressure oscillation to a patient's chest wall, wherein the fluid bladder includes first and second bladder layers secured together about an outer periphery of the fluid bladder, wherein the fluid bladder has at least one fluid restriction adapted to block against fluid flow within the pressurizable chamber, wherein the fluid restriction is formed by coupling the first and second bladder layers together at a location spaced from the outer periphery and oriented to align with the patient's spine when the garment is dressed on the patient, and a pair of pneumatic connectors secured to the fluid bladder and being in pneumatic communication with the pressurizable chamber, wherein the pair of pneumatic connectors are arranged on the fluid bladder at locations that permit each pneumatic connector of the pair of pneumatic connectors to extend through a respective one of the openings of the pair of openings in the outer layer of the garment to assist in properly aligning the fluid bladder within the bladder pocket after the fluid bladder is inserted therein.

2. The HFCWO therapy garment of claim 1, wherein the outer layer of the garment has a first set of fasteners within the bladder pocket and the fluid bladder has a second set of fasteners, wherein the second set of fasteners couple to the first set of fasteners to further assist in properly aligning the fluid bladder within the bladder pocket after the fluid bladder is inserted therein.

3. The HFCWO therapy garment of claim 2, wherein the first set of fasteners comprise snap receivers and the second set of fasteners comprise snaps that are receivable in the snap receivers.

4. The HFCWO therapy garment of claim 3, further comprising a set of snap buttons that are situated on an exterior of the outer layer and coupled to the snap receivers, the snap buttons being pressable by a user to force the snap receivers onto the snaps.

5. The HFCWO therapy garment of claim 2, wherein one of the first set of fasteners and the second set of fasteners comprises male fasteners and wherein the other of the first set of fasteners and the second set of fasteners comprises female fasteners.

6. The HFCWO therapy garment of claim 1, wherein the pair of pneumatic connectors comprise elbow connectors.

7. The HFCWO therapy garment of claim 6, wherein the elbow connectors are each bent at a 60 degree angle at a crook of the respective elbow.

8. The HFCWO therapy garment of claim 1, wherein the at least one fluid restriction comprises a pair of fluid restrictions.

9. The HFCWO therapy garment of claim 1, wherein the at least one fluid restriction is formed by at least one weld seam between the first and second bladder layers of the fluid bladder.

10. The HFCWO therapy garment of claim 9, wherein the at least one weld seam comprises a pair of weld seams.

11. The HFCWO therapy garment of claim 9, wherein the weld seam comprises a seam formed by sonic welding or radio frequency (RF) welding.

12. The HFCWO therapy garment of claim 1, wherein the first bladder layer serves as an outer wall of the fluid bladder and the second bladder layer serves as an inner wall of the fluid bladder, wherein the pneumatic connectors are attached to the outer wall, and wherein the inner wall includes at least one air bleed hole.

13. The HFCWO therapy garment of claim 12, wherein the at least one air bleed hole includes first and second air bleed holes separated by the at least one fluid restriction.

14. The HFCWO therapy garment of claim 12, wherein the at least one air bleed hole includes first and second pairs of air bleed holes separated by respective portions of the at least one fluid restriction.

15. The HFCWO therapy garment of claim 1, wherein the garment includes a first fastener section and a second fastener section that releasably couples with the first fastener section to secure the HFCWO therapy garment about the patient's torso and wherein the pneumatic connectors are situated between the first and second fastener sections.

16. The HFCWO therapy garment of claim 15, wherein the first and second fastener sections each include hook and loop fasteners that engage each other to secure the HFCWO therapy garment about the patient's torso.

17. The HFCWO therapy garment of claim 16, wherein the garment further includes a flap that is attached to the second fastener section, wherein the flap includes hook and loop fastener that also engage hook and loop fasteners of the first fastener section such that the first fastener section is sandwiched between the flap and the second fastener section to further secure the HFCWO therapy garment about the patient's torso when the flap is in a closed position.

18. The HFCWO therapy garment of claim 17, wherein the flap overlies one of the pneumatic connectors of the pair of pneumatic connectors when the flap is in a fully opened position.

19. A high frequency chest wall oscillation system comprising:

the high frequency chest wall therapy garment of claim 1, and an air pulse generator in pneumatic communication with the fluid bladder of the HFCWO therapy garment via a pair of hoses that pneumatically connect to the pair of pneumatic connectors.

20. The high frequency chest wall oscillation system of claim 19, wherein the air pulse generator comprises a blower in combination with motor driven pistons or diaphragms that reciprocate toward and away from each other to create pressure pulses relative to a baseline pressure.

* * * * *